United States Patent

Watanabe et al.

[11] Patent Number: 5,811,953
[45] Date of Patent: Sep. 22, 1998

[54] MOTOR DRIVING CIRCUIT AND METHOD

[75] Inventors: Sumio Watanabe; Katsuhiro Maeda; Shuko Yamaji, all of Kawasaki, Japan

[73] Assignee: Fujitsu Limited, Kawasaki, Japan

[21] Appl. No.: 771,807

[22] Filed: Dec. 20, 1996

Related U.S. Application Data

[63] Continuation of Ser. No. 118,174, Sep. 9, 1993, abandoned.

[30] Foreign Application Priority Data

Sep. 9, 1992 [JP] Japan .................................. 4-240428

[51] Int. Cl.$^6$ ........................................................ H02P 1/54
[52] U.S. Cl. ........................... 318/685; 318/109; 318/254; 318/439; 318/442; 318/500; 318/504
[58] Field of Search ..................... 318/105, 106, 318/109, 685, 696, 500, 504, 812–814, 254, 138, 439, 440–442

[56] References Cited

U.S. PATENT DOCUMENTS

| | | | |
|---|---|---|---|
| 3,757,193 | 9/1973 | Inaba et al. | 318/696 |
| 3,893,012 | 7/1975 | Lin | 318/696 |
| 3,903,467 | 9/1975 | Eckardt | 318/696 |
| 4,025,859 | 5/1977 | Smith | 318/696 |
| 4,075,541 | 2/1978 | Shibata et al. | 318/139 |
| 4,434,392 | 2/1984 | Brasseur | 318/696 |
| 4,490,665 | 12/1984 | Meyer et al. | 318/696 |
| 4,757,247 | 7/1988 | Ranger | 318/696 |
| 4,769,585 | 9/1988 | Tanuma et al. | 318/696 |
| 4,788,484 | 11/1988 | Bolash et al. | 318/696 |
| 4,829,222 | 5/1989 | Hallenbeck et al. | 318/696 |
| 4,879,498 | 11/1989 | Shinohara et al. | 318/254 |
| 5,034,674 | 7/1991 | Sato | 318/696 |
| 5,175,483 | 12/1992 | Fujii et al. | 318/807 |
| 5,221,885 | 6/1993 | Molieri et al. | 318/685 |
| 5,283,510 | 2/1994 | Tamaki et al. | 318/696 |
| 5,325,030 | 6/1994 | Yamamura et al. | 318/563 |

FOREIGN PATENT DOCUMENTS

| | | |
|---|---|---|
| 52-004008 | 1/1977 | Japan . |
| 53-128714 | 11/1978 | Japan . |
| 62-118794 | 5/1987 | Japan . |
| 63-092484 | 4/1988 | Japan . |
| 63-110996 | 5/1988 | Japan . |

Primary Examiner—Brian Sircus
Attorney, Agent, or Firm—Staas & Halsey

[57] ABSTRACT

A motor driving circuit coupled to a motor having a plurality of phases of coils includes a standard power source generating a first power supply voltage, and a step-up power source for generating a second power supply voltage greater than the first power supply voltage. A selecting circuit selects either the first power supply voltage or the second power supply voltage in response to a selecting signal. A motor driving circuit causes currents to flow in the phases of the motor in accordance with motor driving signals respectively related to the phases in a state in which a selected power supply voltage output by the selecting circuit is applied to one or more phases. A switching unit generates the selecting signal on the basis of the motor driving signals and a voltage signal corresponding to a current flowing through at least one of the phases of the motor so that the second power supply voltage is selected first and the first power supply voltage is selected second with respect to each of the phases.

14 Claims, 23 Drawing Sheets

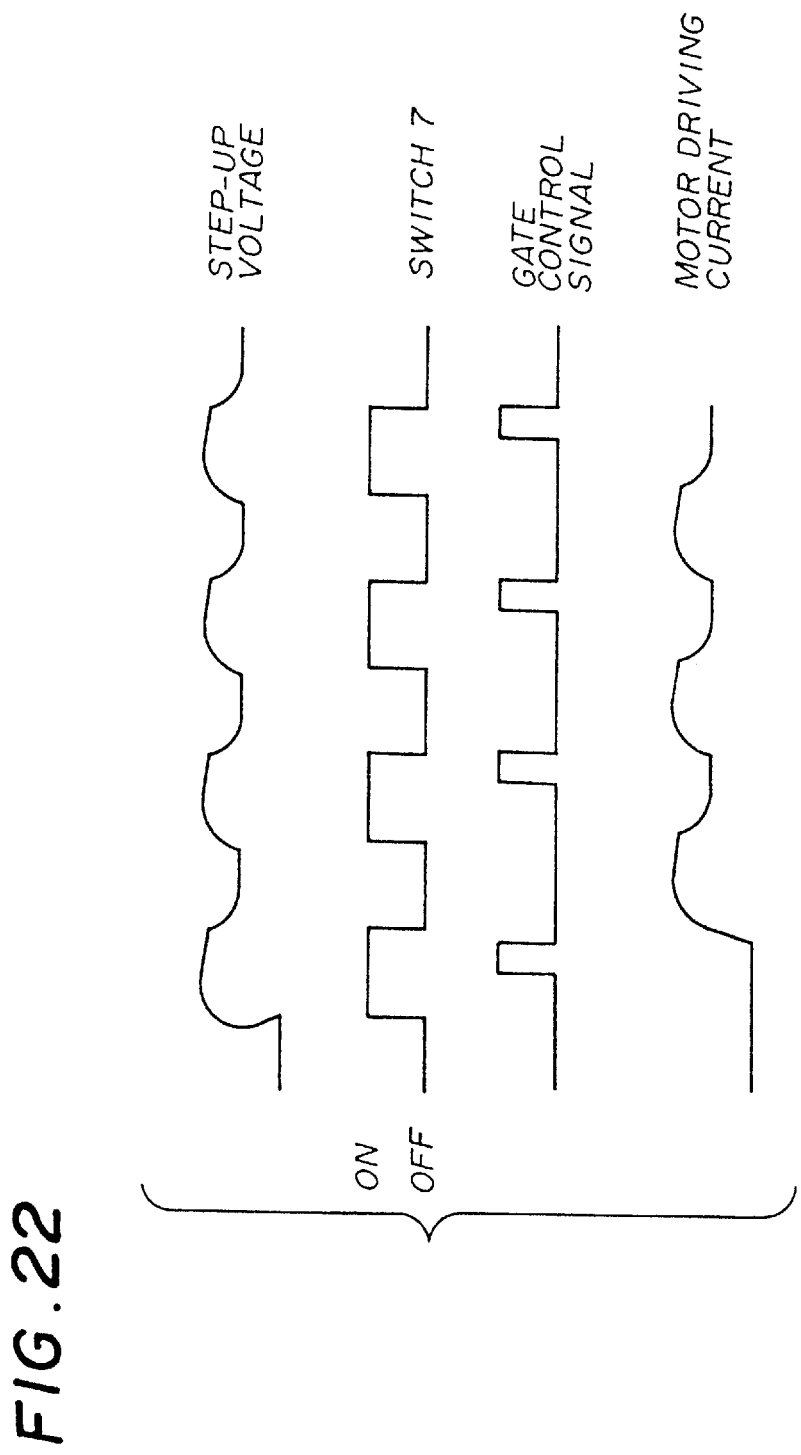

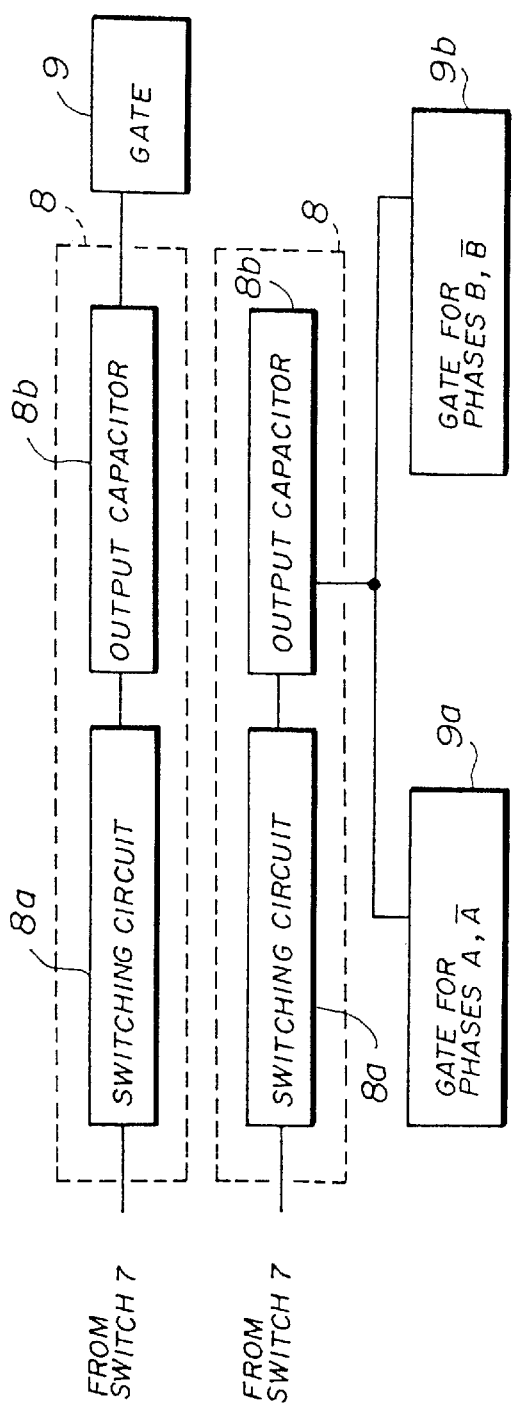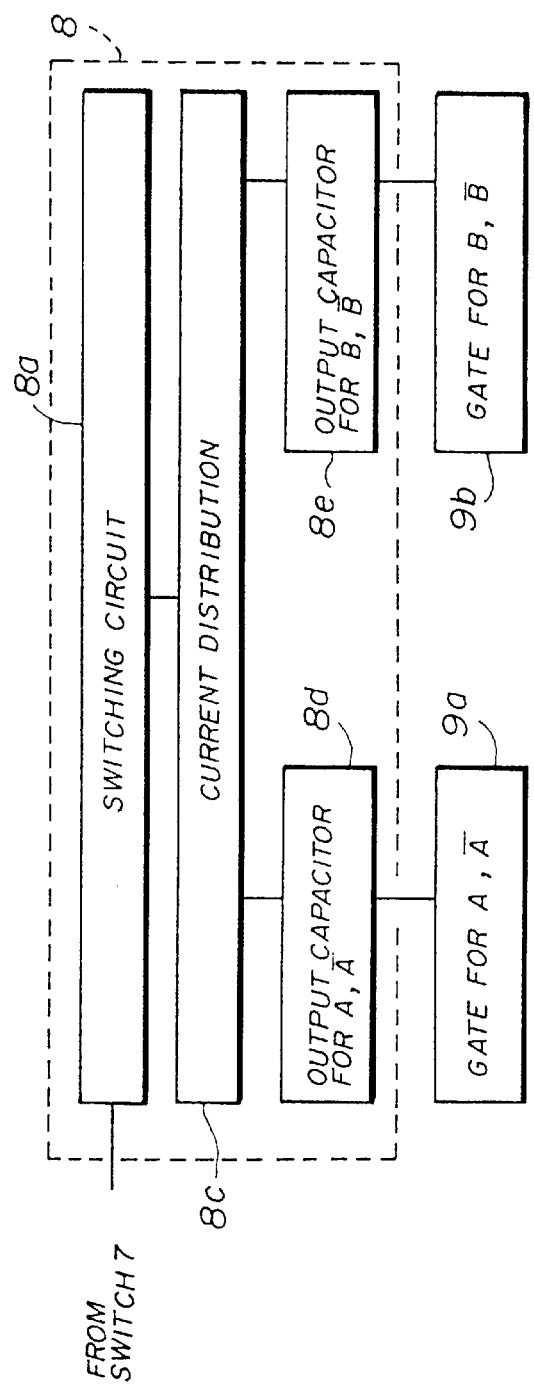
FIG.23A
FIG.23B
FIG.23C

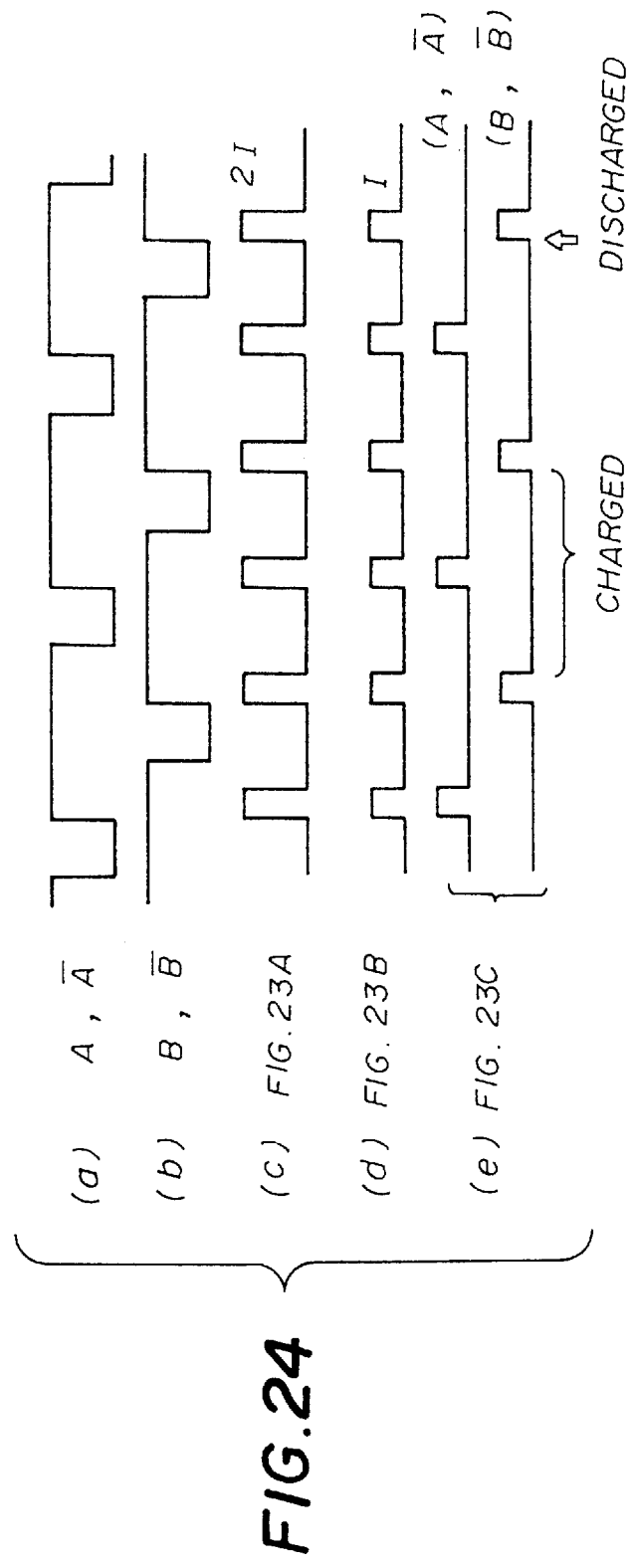

MOTOR DRIVING CIRCUIT AND METHOD

This application is a continuation of application Ser. No. 08/118,174, filed Sep. 9, 1993, now abandoned.

BACKGROUND OF THE INVENTION

1. Background of the Invention

The present invention generally relates to motor driving circuits, and more particularly to a motor driving circuit suitable for driving a motor in a battery-driven portable electronic device, such as a portable printing machine having a built-in battery.

2. Description of the Prior Art

Recently, a portable terminal device having a built-in printing machine, such as a POS (Point Of Sales) terminal, has been proposed. Such a device is equipped with a motor driving circuit for driving a motor of the printing machine. As is well known, various motor driving circuits have been proposed. Recent portable devices are driven by a built-in battery, that is, a low-voltage power source. Generally, as the voltage of the power source is decreased, the leading edge of a motor driving current waveform becomes dull, and high-speed driving of the motor becomes difficult.

The above problem will now be described in more detail. The stepping motors are classified into a unipolar exciting system or a bipolar exciting system in terms of the motor exciting system. Further, the motor exciting system is classified into a one-phase exciting system, a one-/two-phase exciting system or a two-phase exciting system, as shown in FIGS. 1A, 1B and 1C, respectively. The rising response of the motor driving current waveforms should be considered at portions of the current waveforms indicated by arrows shown in FIGS. 1A, 1B and 1C.

The rising responses of the motor driving current waveforms relate to switching from a low potential to a high potential (switching from a voltage-OFF state to a voltage-ON state in FIGS. 1A–1C). The rising responses of the motor driving current waveforms should also be considered in a case shown in FIG. 2A in which the amount of current is increased in a stepwise manner.

Normally, the motor driving current waveforms have response characteristics dependent on the amount of current, as shown in FIG. 2B. In FIG. 2B, the leading edge of the driving current becomes shaper in the order of I4, I3, I2 and I1 as the voltage applied to the motor is increased. In other words, it takes a shorter time for the driving current to rise to a predetermined (threshold) level as the voltage applied to the motor is increased. On the other hand, the leading edge of the driving current becomes dull and it takes a longer time for the driving current to rise to the predetermined level as the voltage applied to the motor is decreased.

When the voltage applied to the motor is low, it takes a long time to raise the driving current to the predetermined level. When the motor is used in a high-speed range, the driving current will have a leading edge as indicated by a broken line shown in FIG. 2C. When the motor is used in a low-speed range, the driving current will have a leading edge as indicated by a solid line shown in FIG. 2C. The leading edges of the driving currents are dull, as shown in FIG. 2C. Further, the maximum level IP' of the driving current used when the motor is used in the high-speed range is much lower than the maximum level IP thereof used when the motor is used in the low-speed range. Hence, it is impossible to obtain a large torque when the motor is used in the high-speed range.

SUMMARY OF THE INVENTION

It is a general object of the present invention to provide a motor driving circuit and method in which the rising response of a motor driving current is improved without much increase in power consumption.

The above object of the present invention is achieved by a motor driving circuit coupled to a motor having a plurality of phases of coils, the motor driving circuit comprising: a standard power source generating a first power supply voltage; a step-up power source for generating a second power supply voltage greater than the first power supply voltage; selecting means, coupled to the standard power source and the step-up power source, for selecting either the first power supply voltage or the second power supply voltage in response to a selecting signal; motor driving means for causing currents to flow in the phases of the motor in accordance with motor driving signals respectively related to the phases in a state in which a selected power supply voltage output by the selecting means is applied to one or more phases; and switching means, coupled to the selecting means, for generating the selecting signal on the basis of the motor driving signals and a voltage signal corresponding to a current flowing through at least one of the phases of the motor so that the second power supply voltage is selected first and the first power supply voltage is selected second with respect to each of the phases.

The above objects of the present invention are also achieved by a motor driving circuit for driving a motor having a plurality of phases of coils, the motor driving circuit comprising: first means for detecting leading edges of motor driving signals respectively applied to the phases of the motor; second means for applying a step-up voltage to the phases on the basis of the leading edges detected by the first means; third means for detecting a magnitude of a current flowing in at least one of the phases; and fourth means for applying a standard voltage less than the step-up voltage to the phases on the basis of the magnitude of the current detected by the third means.

The above objects of the present invention are also achieved by a motor driving method for driving a motor having a plurality of phases of coils, the motor driving method comprising the steps of: (a) detecting leading edges of motor driving signals respectively applied to the phases of the motor; (b) applying a step-up voltage to the phases on the basis of the leading edges detected by the step (a); (c) detecting a magnitude of a current flowing in at least one of the phases; and (d) applying a standard voltage less than the step-up voltage to the phases on the basis of the magnitude of the current detected by the step (c).

BRIEF DESCRIPTION OF THE DRAWINGS

Other bjects, features and advantages of the present invention 1 become more apparent from the following detailed description when read in conjunction with the accompanying drawings, in which:

FIG. 22 is a waveform diagram of the operation of the variation shown in FIG. 18;

FIG. 23A is a block diagram of the outline of the first embodiment of the present invention;

FIG. 23B is a block diagram of an overview of a second embodiment of the present invention;

FIG. 23C is a block diagram of an overview of a third embodiment of the present invention;

FIG. 24 is a waveform diagram for explaining the operations of the first, second and third embodiments of the present invention respectively shown in FIGS. 23A, 23B and 23C.

DESCRIPTION OF THE PREFERRED EMBODIMENTS

In order to facilitate understanding of the present invention, a description will now be given of a motor driving circuit related to the present invention.

Figures 1A, 1B, 1C:
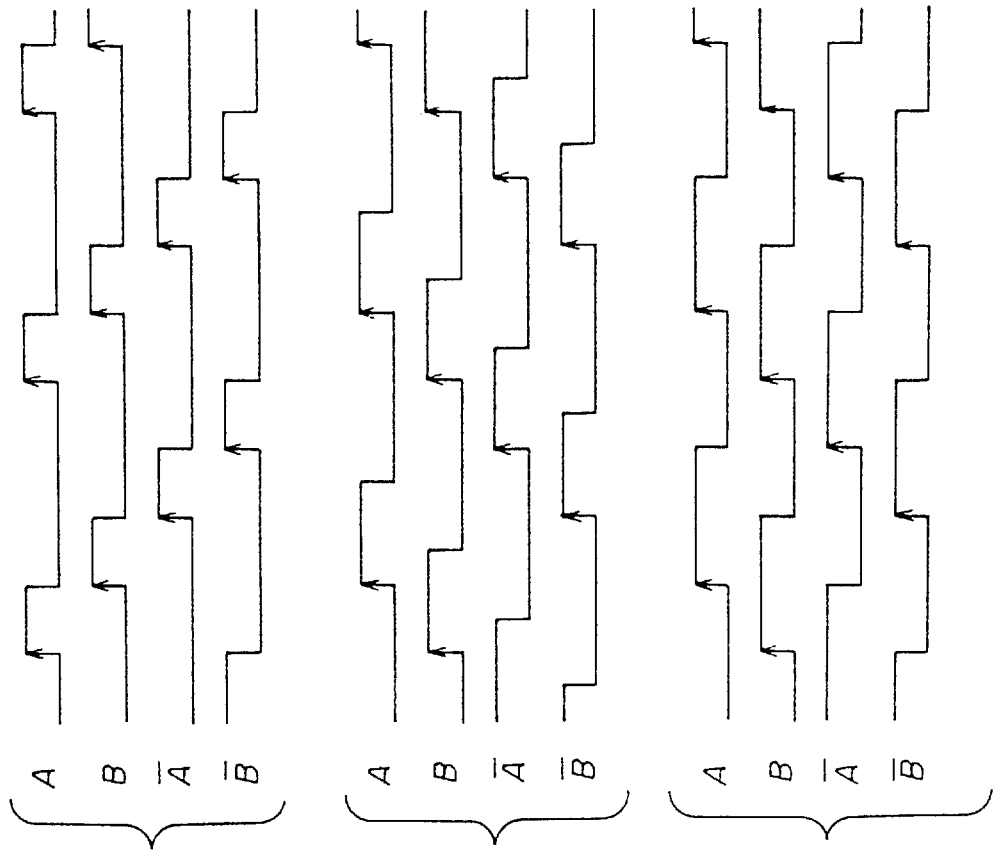
FIGS. 1A, 1B and 1C are waveform diagrams illustrating exciting systems for a motor.
Figure 2A:
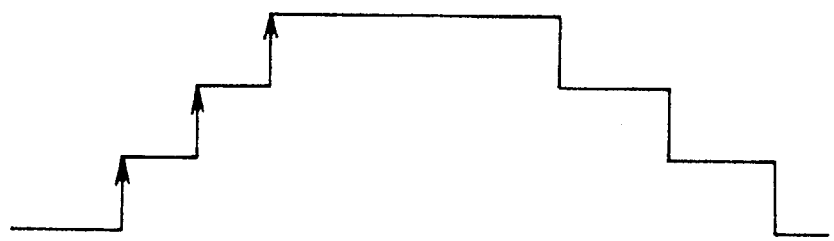
FIGS. 2A, 2B and 2C are waveform diagrams illustrating the rising response of motor driving currents.
Figure 2B:
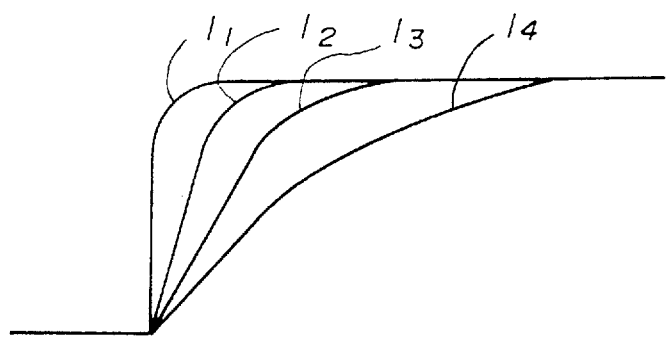
Figure 2C:
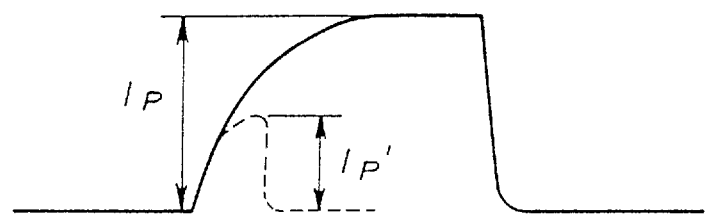
Figure 3:
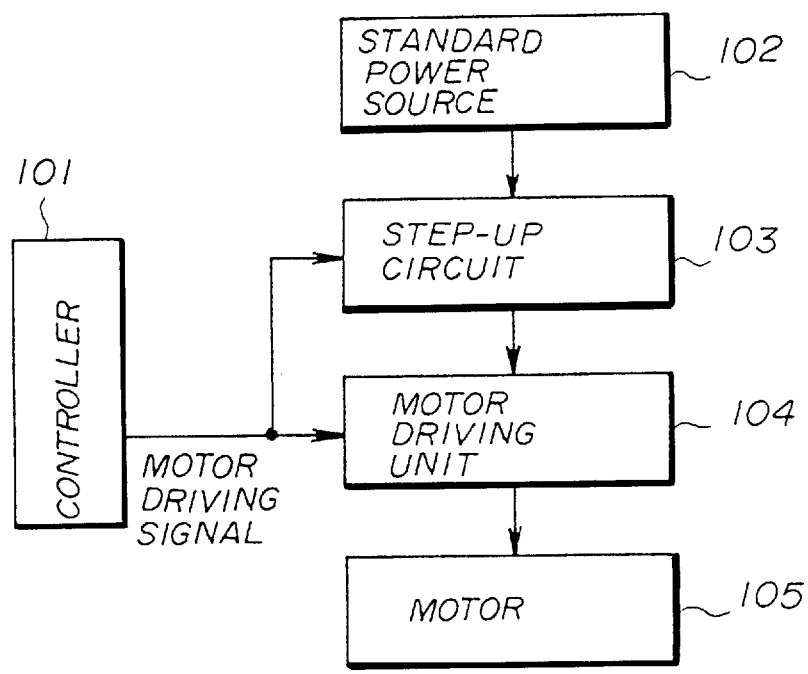
FIG. 3 is a block diagram of a motor driving circuit related to the present invention.

FIG. 3 is a block diagram of such a related motor driving circuit, which is made up of a controller 101, a standard power source 102, a voltage step-up circuit 103, and a motor driving unit 104 connected to a motor 105. The controller 101 controls the overall operation of the motor driving circuit. The standard power source 102 supplies the overall motor driving circuit with electricity, and is formed by a battery. The step-up circuit 103 steps up a standard power supply voltage generated by the standard power source 102, and supplies a step-up voltage to the motor driving unit 104. The motor driving unit 104 supplies the motor 105 with a motor driving current dependent on the power supply voltage supplied from the step-up circuit 103.

When the motor is driven, the step-up voltage generated by the step-up circuit 103 is supplied to the motor driving unit 104, which supplies the motor 105 with the motor driving current while the motor 105 is being operated. Since the motor 105 is supplied with the step-up voltage, the rising response of the motor driving current can be improved.

The motor driving circuit shown in FIG. 3 consumes a large quantity of electricity because the step-up voltage is continuously supplied to the motor 105 during the time when the motor is operating. An increase in the power consumption in the battery-driven electronic devices reduces the battery drivable time. In the worst case, the motor 105 may stop during the operation.

In order to eliminate the above problem, it may be possible to operate the motor at a low speed at which the motor can follow the rounded (dull) leading edge of the motor driving current, rather than the step-up of the driving voltage and to then accelerate the motor. However, the above method would decrease the effective revolution speed. This is a problem in that, for example, a decrease in the effective revolution speed of the motor of a printing machine prevents high-speed printing. In order to increase the effective revolution speed, it is necessary to increase the revolution frequency at which the motor can follow without acceleration and to improve the frequency characteristics.

The present invention is intended to eliminate the above disadvantages, and more particularly to improve the rising response of the motor driving current waveform and the frequency characteristics thereof and to suppress power consumption.

Figure 4:
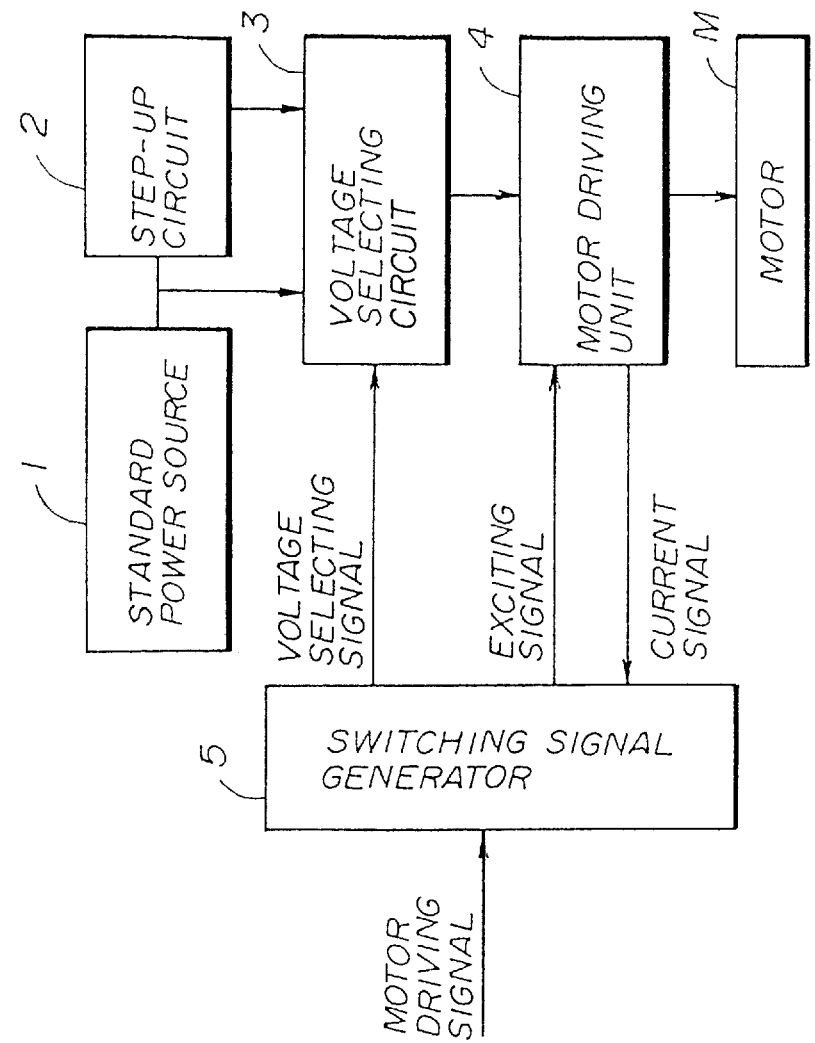
FIG. 4 is a block diagram of the principle of the present invention.

FIG. 4 is a block diagram of a motor driving circuit according to a first embodiment of the present invention. The motor driving circuit shown in FIG. 4 is made up of a standard power source 1, a step-up circuit 2, a voltage selecting circuit 3, a motor driving unit 4 connected to a motor M, and a switching signal generator 5.

The standard power source 1 is, for example, a battery, and generates a standard (low potential) power supply voltage applied to the motor M. The step-up circuit 2 steps up the standard power supply voltage generated by the source 1 to a predetermined voltage. The voltage selecting circuit 3 selects either the standard power supply voltage from the power source 1 or the step-up voltage from the step-up circuit 2 on the basis of a switching signal functioning as a voltage selecting signal supplied from the switching signal generator 5. The motor driving unit 4 handles the selected voltage as a motor driving voltage, and drives the motor M in response to a motor exciting signal output by the switching signal generator 5. The switching signal generator 5 outputs the driving signal to the motor driving unit 4 on the basis of a current flowing in the motor driving unit 4 and a motor driving signal externally supplied, and outputs the voltage selecting (switching) signal to the voltage selecting circuit 3.

According to the motor driving circuit shown in FIG. 4, the step-up voltage is applied to the motor driving unit 4 only when the corresponding motor driving current rises, whereby the rising response and the frequency characteristic of the motor driving current can be improved, particularly when the standard power supply voltage for driving the motor M is low. Further, it is possible to suppress power consumption since the step-up voltage is applied to the motor driving unit 4 only when the motor driving current rises.

Figure 5:
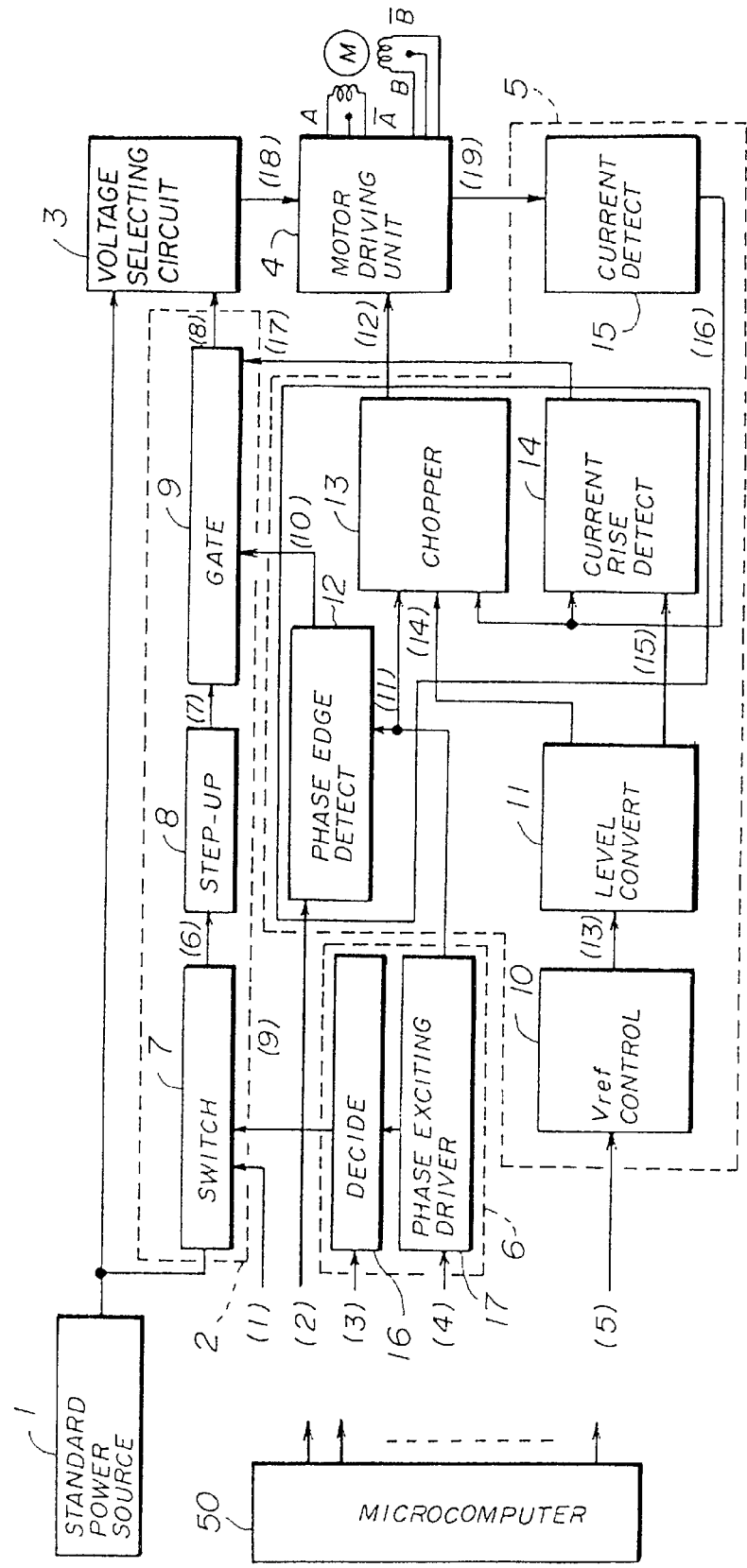
FIG. 5 is a block diagram of a motor driving circuit according to a first embodiment of the present invention.

FIG. 5 is a block diagram of the details of the configuration shown in FIG. 4. In FIG. 4, parts that are the same as those shown in FIG. 4 are given the same standard numbers as previously. A control unit 6 is added to the configuration shown in FIG. 4.

The step-up circuit 2 is made up of a step-up power source switch 7, a step-up power source 8, and a step-up power source gate 9. The step-up power source switch 7 controls the supply of the standard power supply voltage to the step-up power source 8, and performs a switching operation by means of transistors. The step-up power source 8 is formed by a conventional IC for power supply, and steps up the standard (low voltage) power supply voltage to a predetermined voltage. As has been pointed out previously and will be described in detail later, the predetermined (step-up) voltage is applied to the motor driving unit 4 only when the motor driving current dependent on the step-up voltage rises. The step-up power source gate 9 carries out a gate control operation on the step-up voltage, and comprises, for example, transistors.

The voltage selecting circuit 3 performs switching between the standard power supply voltage generated by the standard power source 1 and the step-up voltage generated by the step-up circuit 2, and is formed by, for example, diodes. More particularly, the anodes of the diodes are respectively connected to the standard power source 1 and the gate 9, and the cathodes thereof are connected together. The function of the voltage selecting circuit 3 shown in FIG. 4 is achieved by the voltage selecting circuit 3 and the gate 9 shown in FIG. 5. The motor driving unit 4 is formed by, for example, transistors, and controls the motor driving current that flows in the motor M. The switching signal generator 5 is made up of a reference voltage generating circuit, a feedback circuit, and a current detector 15.

The reference voltage generating circuit is made up of a Vref (reference voltage) control circuit 10 and a level converter 11. The feedback circuit is made up of a phase-edge detector 12, a constant-current chopper circuit 13, and a current rise detector 14. The Vref control circuit 10 decodes a Vref setting signal (which will be described later), and thereby generates a predetermined threshold voltage. The level converter 11 receives the voltage signal generated by the Vref control circuit 10 and thereby outputs control signals to the constant-current chopper circuit 13 and the current rise detector 14.

The phase-edge detector 12 derives an edge signal from excitation timing signals, or is allowed to pass through a phase-edge signal generating by a microcomputer 50 in order to control the step-up power source gate 9. The constant-current chopper circuit 13 generates a control signal by comparing a voltage generated by the current detector 15 with a chopper reference (threshold) voltage signal, and performs a feedback control by turning ON/OFF transistors of the motor driving unit 4. The current rise detector 14 generates a timing signal for stopping supply of the step-up power supply voltage by comparing the reference voltage and the voltage generated by the current detector 15. The current detector 15 generates the voltage proportional to the motor driving current flowing in the motor M.

The control unit 6 includes a power source control decision unit 16 and a phase exciting driver 17. The decision unit 17 performs a control of power supply to the step-up circuit 2, by using the excitation timing signals. The phase exciting driver 17 converts the level of excitation timing signals from the microcomputer 50 into levels (motor exciting signals) suitable for subsequent circuit blocks, and is made up of, for example, logic ICs or comparators.

Now, signals (1)–(19) shown in FIG. 5 are named as follows; (1) . . . step-up power source switching signal, (2) . . . phase-edge signal, (3) . . . power source control decision control signal, (4) . . . excitation timing signals, (5) . . . Vref setting signal, (6) . . . step-up power source input signal, (7) . . . step-up power source output signal, (8) . . . step-up power supply signal, (9) . . . phase-synchronized power source control signal, (10) . . . phase-synchronized step-up power supply gate control signal, (11) . . . motor exciting signals, (12) . . . motor driving circuit chopping input signal, (13) . . . reference voltage signal, (14) . . . chopper reference voltage signal, (15) . . . current rise detection reference voltage signal, (16) . . . current detection signal, (17) . . . step-up power supply signal by a waveform rise response, (18) . . . unit power supply voltage signal applied to the motor driving unit 4, and (19) . . . motor current signal.

The signals (1) through (5) are generated by the microcomputer 50.

The step-up power source switching signal (1) is used to turn ON/OFF the step-up circuit 2. The step-up power source switch 7 operates in response to the switching signal (1). The switch 7 prevents the standard power supply voltage from being applied to the step-up power source 8 when it is not necessary to supply the step-up voltage to the motor M because the voltage applied thereto is high enough to normally operate the motor or when there is no need to improve the rising response of the motor driving current because the motor M is operating at a low speed.

The phase-edge signals (2) are generated by the microcomputer 50. The power source control decision control signal (3), which is generated by the microcomputer 50, turns ON the step-up circuit 2 during the rest period in the phase excitation, and charges up a capacitor provided in the step-up power source 8. More particularly, the control signal (3) is applied to the power source control decision unit 16, and turns ON the step-up power source switch 7 by means of the unit 16 when the control signal (3) is active. The unit 16 generates the control signal (9), which is a pulse signal synchronized with the excitation timing signals A, ⁻A, B and ⁻B (⁻ means a "top bar" as shown in the figures). The motor exciting signals (4), which are generated by the microcomputer 50, are used to excite the phases (coils) of the motor 5. The motor M is, for example, a stepping motor.

The Vref setting signal (5), which is generated by the microcomputer 50, is used to set threshold voltages to be compared with the voltage based on the current detected by the current detector 15. The step-up power source input signal (6) is the standard voltage allowed to pass through the switch 7, and is applied to the step-up power source 8. The step-up power source output signal (7) is the output signal of the step-up power source 8.

The step-up power supply signal (8) is the step-up power supply signal passing through the gate 9, and is applied to the motor driving unit 4 via the voltage selecting circuit 3. The phase-synchronized power supply signal (9) is synchronized with the motor exciting signals (11), and is used to turn ON/OFF the step-up power source 8. The phase-synchronized step-up power supply gate control signal (10) is synchronized with the motor exciting signals (11), and causes the step-up voltage to the motor driving unit 4 via the voltage selecting circuit 3. The motor exciting signals (11) depend on the stepping operation of the motor M. The motor driving circuit chopping input signal (12) performs a chopping operation on the power supply signal applied to the motor driving unit 4 by comparing the voltage generated by the Vref control circuit 10 and the voltage generated by the current detector 15 in order to stabilize the motor driving current.

The reference voltage signal (13) is generated by the Vref control circuit 10 and depends on the setting level (threshold level) of the motor driving (coil) current. The chopper reference voltage signal (14) is output from the level converter 11, and is applied to the constant-current chopper circuit 13. The current rise detection reference (threshold) voltage signal (15) turns OFF the supply of the step-up voltage when the motor driving current reaches the predetermined value in order to reduce the capacity of the step-up power source 2. The current detection signal (16) is generated by the current detector 15, and is dependent on the motor driving current flowing in the motor M. The step-up power supply signal (17) continues to open the step-up power supply gate 9 until the motor driving current does not reach the predetermined level, and closes the gate 9 when the motor driving current reaches the predetermined level. The motor current signal (19) is a motor driving current, which is a combined version of signals in phases $A^-$, B and $B^-$, or which is one of these signals.

Figure 6:
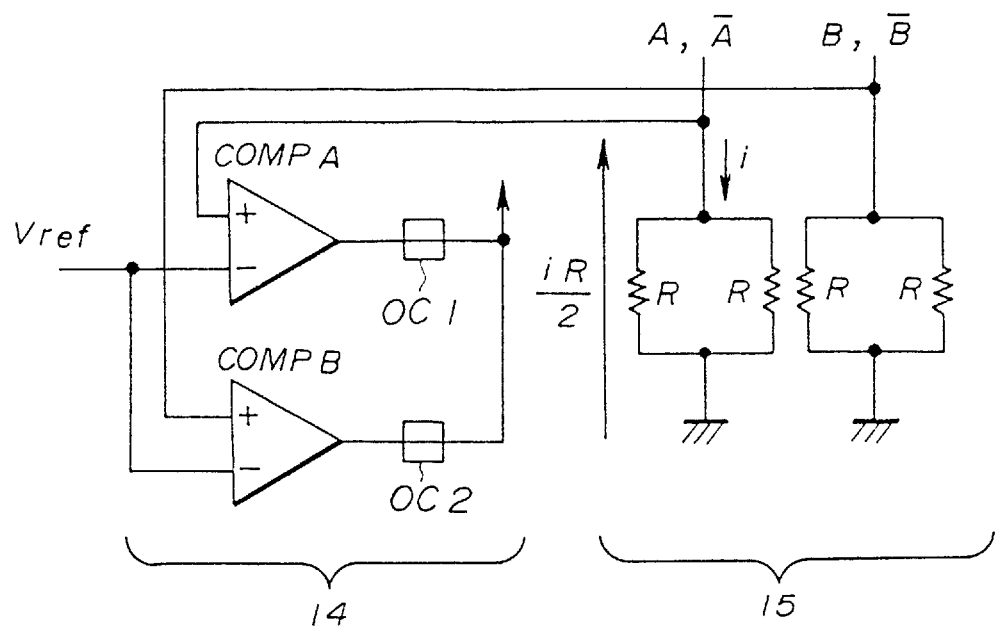
FIG. 6 is a block diagram of a current detector and a current rise detector shown in FIG. 5.
Figure 7:
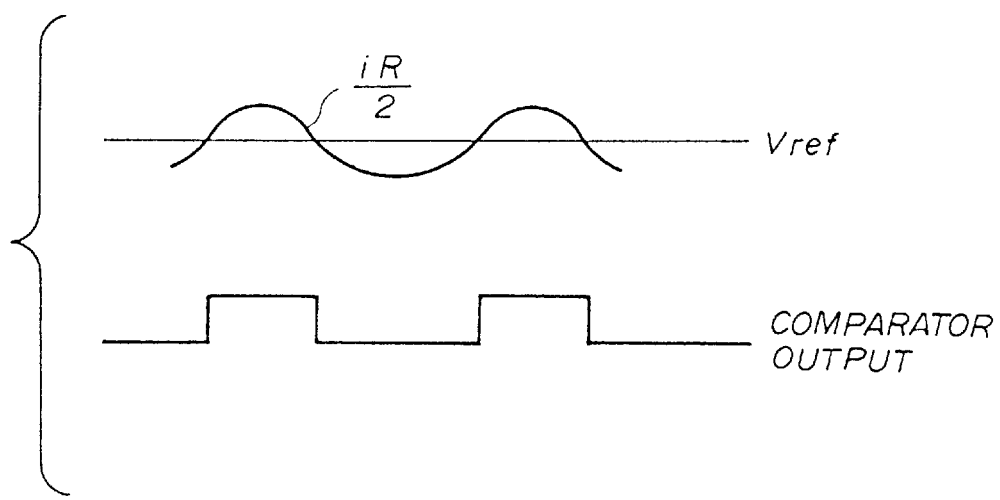
FIG. 7 is a waveform diagram showing the operation of the configuration shown in FIG. 6.

FIG. 6 is a block diagram of the current rise detector 14 and the current detector 15 shown in FIG. 5. When a current i flows in the phase A or $^-$A, a detection voltage $iR/2$ dependent on the current i develops across a parallel circuit consisting of two resistors R, which are structural elements of the current detector 15. A comparator COMP A is provided for the phases A and $^-$A, and a comparator COMP B is provided for the phases B and $^-$B. These comparators COMP A and COMP B are structural elements of the current rise detector 14. A reference voltage Vref is applied to the comparators COMP A and COMP B. As shown in FIG. 7, the detection voltage $iR/2$ varies with respect to the constant reference voltage, and hence, the output signal of the comparator COMP A is changed as shown in FIG. 7. When the detection voltage $iR/2$ is equal to or greater than the reference voltage Vref, the output signal of the comparator COMP A is maintained at a high level. The comparator COMP B operates in the same manner as the comparator COMP A. The output signals of the comparators COMP A and COMP B pass through open-collector circuits OC1 and OC2, respectively, and are added to each other by means of a wired-OR logic.

Figure 8:
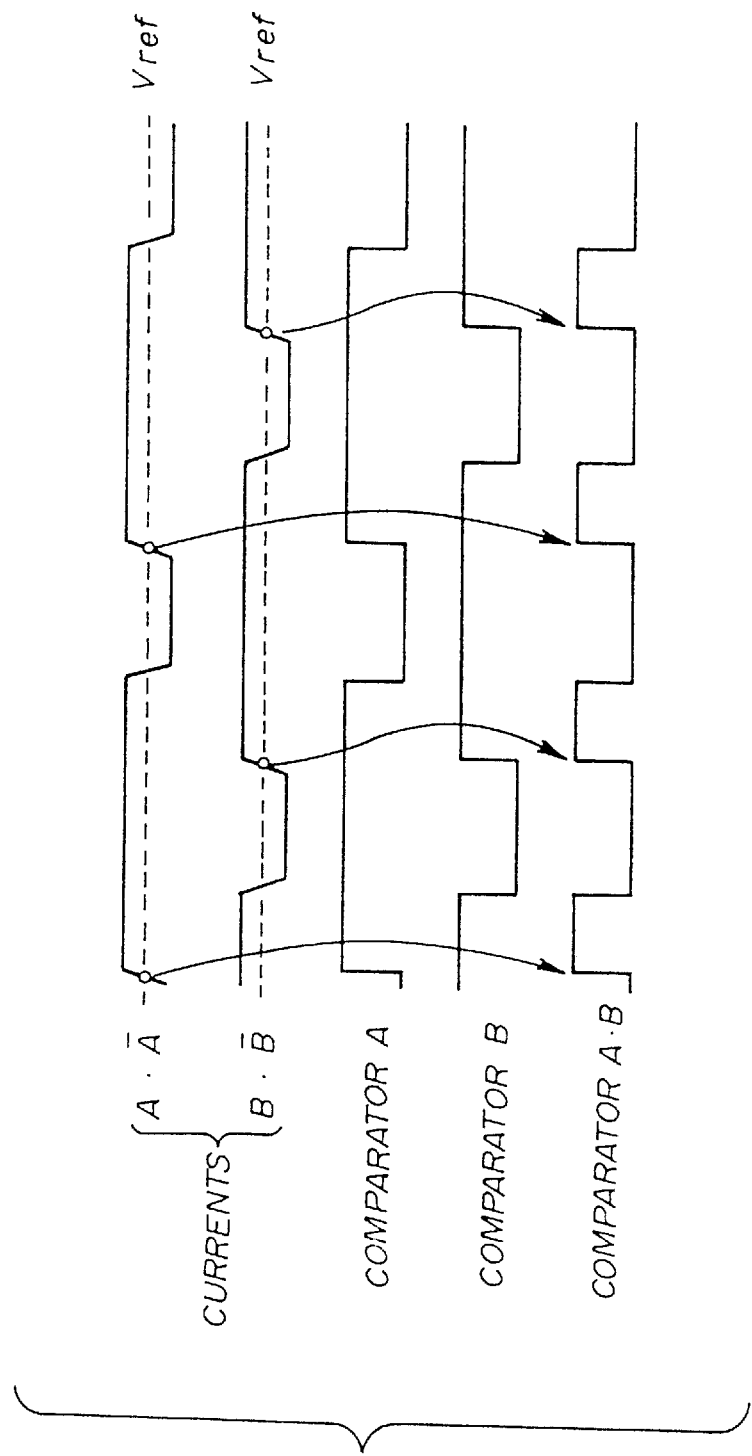
FIG. 8 is a waveform diagram showing the operation of the configuration shown in FIG. 6.

FIG. 8 shows the operation of the circuit configuration shown in FIG. 6. FIG. 8 shows the current flowing in the phases A and $^-$A, the current flowing in the phases B and $^-$B, the output signals of the comparators COMP A and COMP B, and the result of the OR logic operation on the output signals of the comparators COMP A and COMP B. The combined signal corresponding to the result of the OR logic operation rises when either the output signal of the comparator COMP A or the output signal of the comparator COMP B rises, and falls when either the output signal of the comparator COMP A or the output signal of the comparator COMP B falls.

Figure 9:
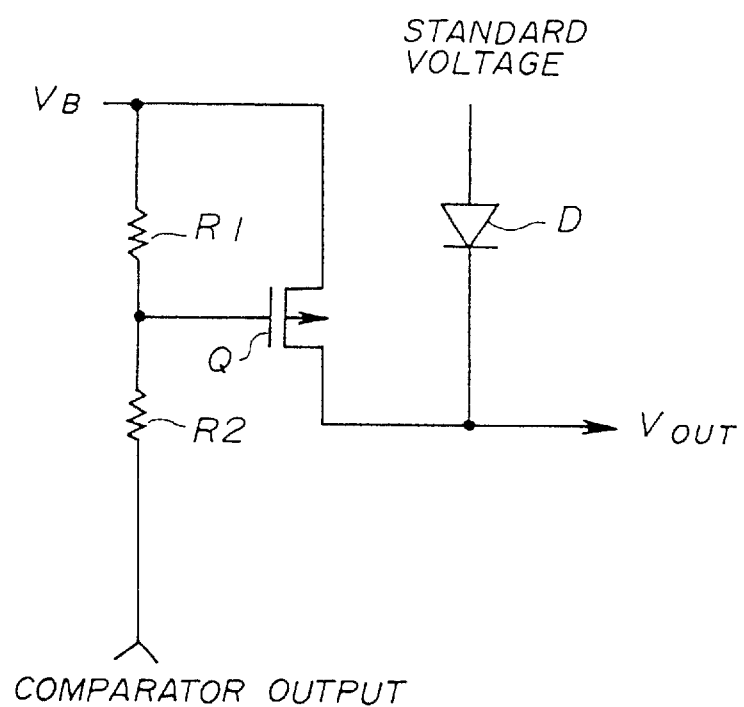
FIG. 9 is a circuit diagram of an open-collector circuit shown in FIG. 6.

FIG. 9 is a circuit diagram of each of the open-collector circuits OC1 and OC2 shown in FIG. 6. Each of the open-collector circuits OC1 and OC2 includes a P-channel MOS transistor Q, two resistors R1 and R2, and a diode D. The step-up voltage $V_B$ is applied to the source of the transistor Q, and the resistor R1 is connected between the gate and source of the transistor Q. The output signal of the comparator COMP A or COMP B shown in FIG. 6 is applied to the gate of the transistor Q via the resistor R2. The standard voltage is applied to the anode of the diode D, and the cathode thereof is connected to the drain of the transistor Q. The output signal Vout of the open-collector circuit is drawn from the drain of the transistor Q.

When the comparator output signal is switched to a low level L, the transistor Q is turned ON, and the step-up voltage $V_B$ is output as the output voltage Vout. In this case, the drain of the transistor Q is reversely biased by means of the diode with respect to the standard voltage. Hence, the output signal Vout is as high as the set-up voltage $V_B$ at the commencement of the conducting period of the transistor Q, and is applied to the gate 9 shown in FIG. 5. Thereby, the step-up voltage is applied to the motor driving unit 4 via the voltage selecting circuit 3, and the current flowing in the motor M is rapidly raised. The step-up voltage is applied to a common terminal of the phases A and $^-$A and a common terminal of the phases B and $^-$B. In FIG. 5, dots depicted in the vicinity of the coils of the motor M denote the common terminals. When the voltage applied to the comparator COMP A (COMP B) exceeds the reference voltage Vref, the output signal of the comparator COMP A (COMP B) becomes high, and the transistor Q is turned OFF. Hence, the standard voltage is applied to the gate 9, and the standard voltage is applied to the motor driving unit 4 via the voltage selecting circuit 3.

A process for detecting the phase edges of the motor M will now be described, the process being carried out by the phase-edge detector 12 or the microcomputer 50 shown in FIG. 5.

It will now be assumed that the phase A is being excited and the phase 'A was excited immediately prior to the phase A. The leading edge U1 obtained at this time is written as follows:

U1=('A XOR A) AND A='$^-$'A AND A
and assumes the values shown in Table 1.

TABLE 1

| 'A | A | U1 |
|----|---|----|
| 0  | 0 | 0  |
| 0  | 1 | 1  |
| 1  | 1 | 0  |
| 1  | 0 | 0  |

Note: $^-$'A does not mean the same signal of $^-$A phase. $^-$A phase means physical signal name. In this case, $^-$'A means a negative of logical prior signal 'A.

Figure 10:
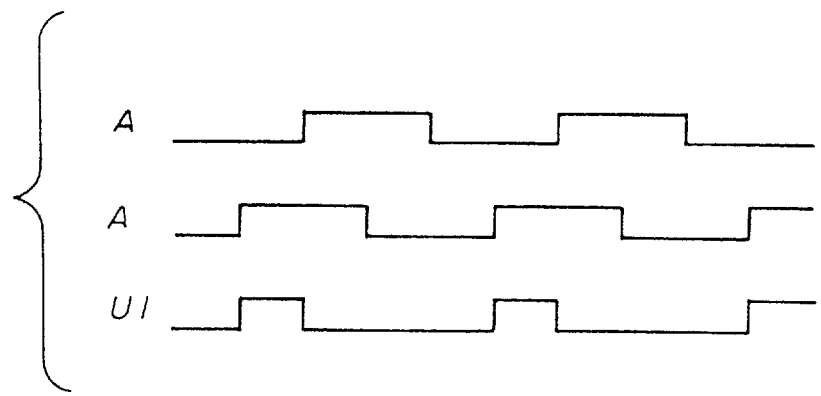
FIG. 10 is a waveform diagram of a phase-edge detecting operation.

FIG. 10 is a waveform diagram illustrating the phase-edge detecting operation.

A description will now be given of changes in edge flags in the actual motor excitation (the edge flags indicating excitation timings for the phases A, $^-$A, B and $^-$B). When the edge flags are 1, currents flow in the corresponding phases (coils). The phases A, $^-$, B and $^-$B, the one-/two-phase excitation, and the two-phase excitation are respectively shown in Tables 2, Table 3 and Table 4.

TABLE 2

| A | B | $^-$A | $^-$B |
|---|---|-------|-------|
| 1 | 0 | 0     | 0     |
| 0 | 1 | 0     | 0     |

TABLE 2-continued

| A | B | ⁻A | ⁻B |
| --- | --- | --- | --- |
| 0 | 0 | 1 | 0 |
| 0 | 0 | 0 | 1 |

TABLE 3

| A | B | ⁻A | ⁻B |
| --- | --- | --- | --- |
| 0 | 0 | 1 | 1 |
| 0 | 0 | 1 | 0 |
| 0 | 1 | 1 | 0 |
| 0 | 1 | 0 | 0 |
| 1 | 1 | 0 | 0 |
| 1 | 0 | 0 | 0 |
| 1 | 0 | 0 | 1 |
| 0 | 0 | 0 | 1 |

TABLE 4

| A | B | ⁻A | ⁻B |
| --- | --- | --- | --- |
| 0 | 0 | 1 | 1 |
| 0 | 1 | 1 | 0 |
| 1 | 1 | 0 | 0 |
| 1 | 0 | 0 | 1 |

Figure 11:
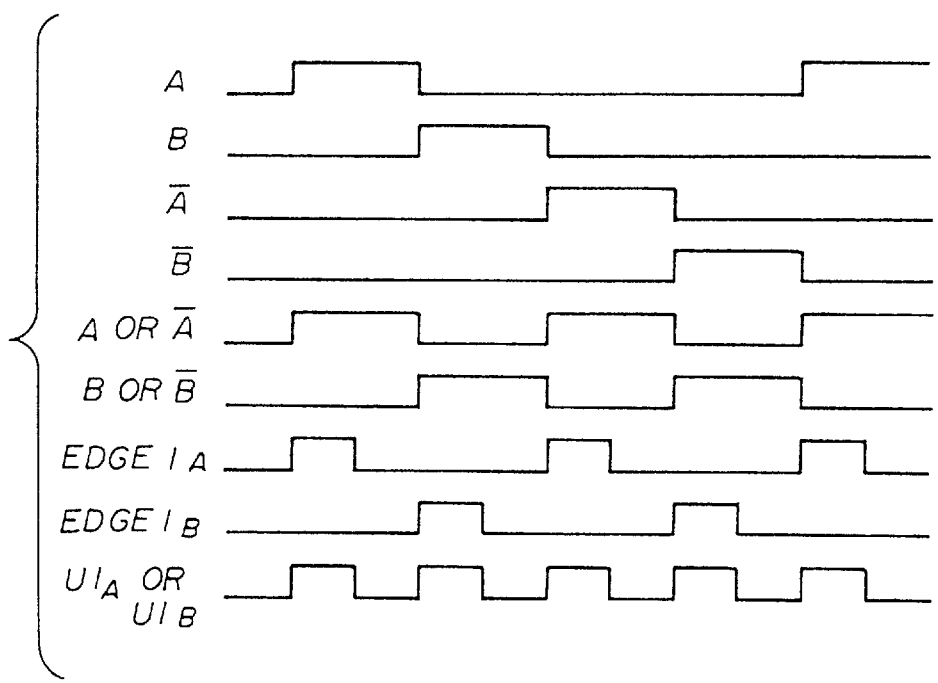
FIG. 11 is a waveform diagram illustrating a one-phase excitation operation of the first embodiment of the present invention.
Figure 12:
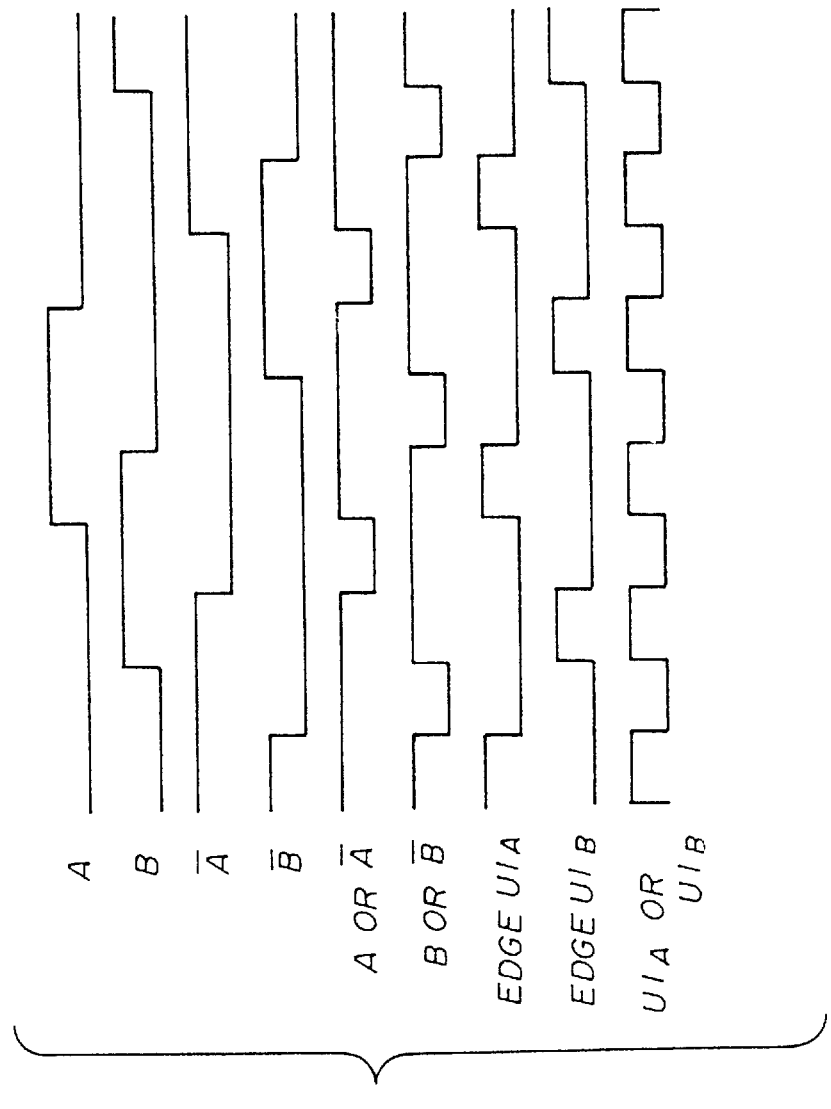
FIG. 12 is a waveform diagram illustrating a one-/two-phase excitation operation of the first embodiment of the present invention.
Figure 13:
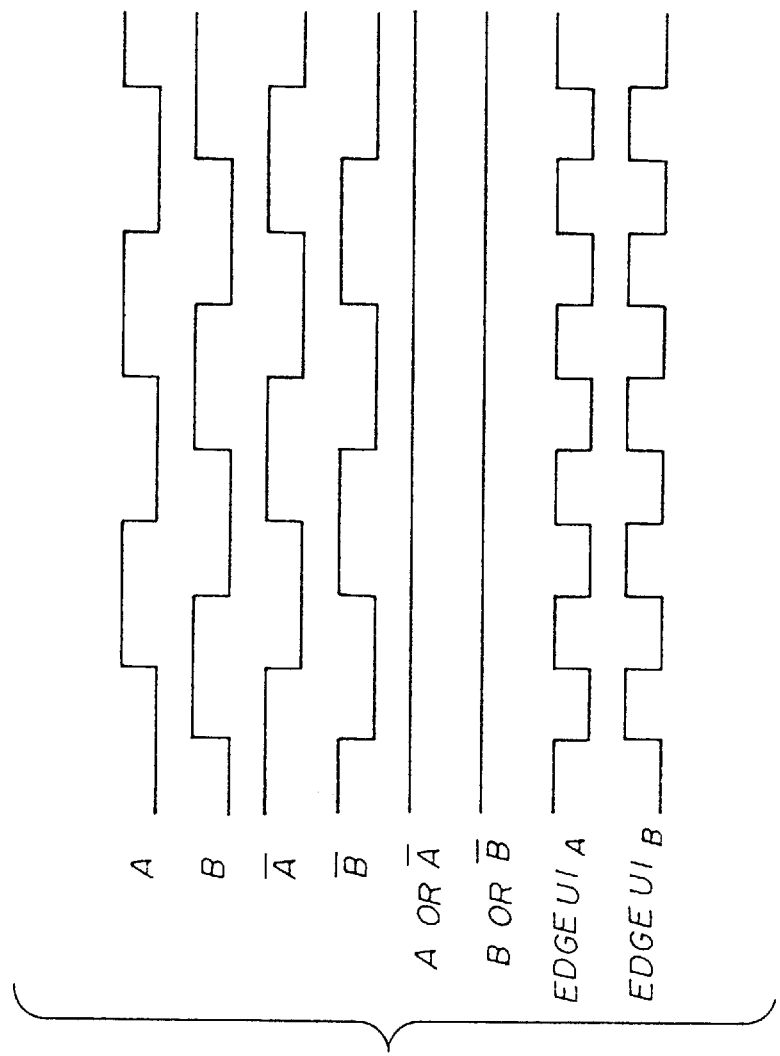
FIG. 13 is a waveform diagram illustrating a two-phase excitation operation of the first embodiment of the present invention.

FIG. 11 is a waveform diagram of the operation timing in the one-phase excitation, FIG. 12 is a waveform diagram of the operation timing in the one-/two-phase excitation, and FIG. 13 is a waveform diagram of the operation timing in the two-phase excitation. In these figures, $U1_A$ indicates the leading edges of the motor (phase) exciting signal related to the phase A, and $U1_B$ indicates the leading edges of the motor exciting signal related to the phase B.

As shown in FIG. 6, the current detection is commonly carried out for the phases A and ⁻A, and is commonly carried out for the phase B and ⁻B. Hence, in the phase-edge detections shown in FIGS. 11 through 13, a signal (A OR ⁻A) is switched to the high level when either the leading edge of the motor exciting signal related to the phase A or phase ⁻A is detected. Similarly, a signal (B OR ⁻B) is switched to the high level when either the leading edge of the motor exciting signal related to the phase B or phase ⁻B is detected.

Further, the AND logic operation on the output signals of the comparators COMP A and COMP B shown in FIG. 6 is carried out via the open-collector circuits OC1 and OC2, and the result of the logic operation is applied to the gate 9 shown in FIG. 5. Hence, the edge detection signal output by the phase-edge detector 12 shown in FIG. 5 is the result of an OR logic operation ($U1_A$ OR $U1_B$) shown in FIGS. 11 and 12. In FIG. 13, either the edge detection signal $U1_A$ or $U1_B$ is output as the edge detection signal.

The gate 9 shown in FIG. 5 is opened when the edge detection signal (gate control signal) (10) is switched to the high level, and is closed when the detection signal Vout (17) shown in FIG. 5 output by the current rise detector 14 becomes equal to the standard threshold voltage. It will be noted that the leading edge of the edge detection signal is synchronized with the leading edge of one of the motor exciting signals A, ⁻A, B and ⁻B.

Figure 14:
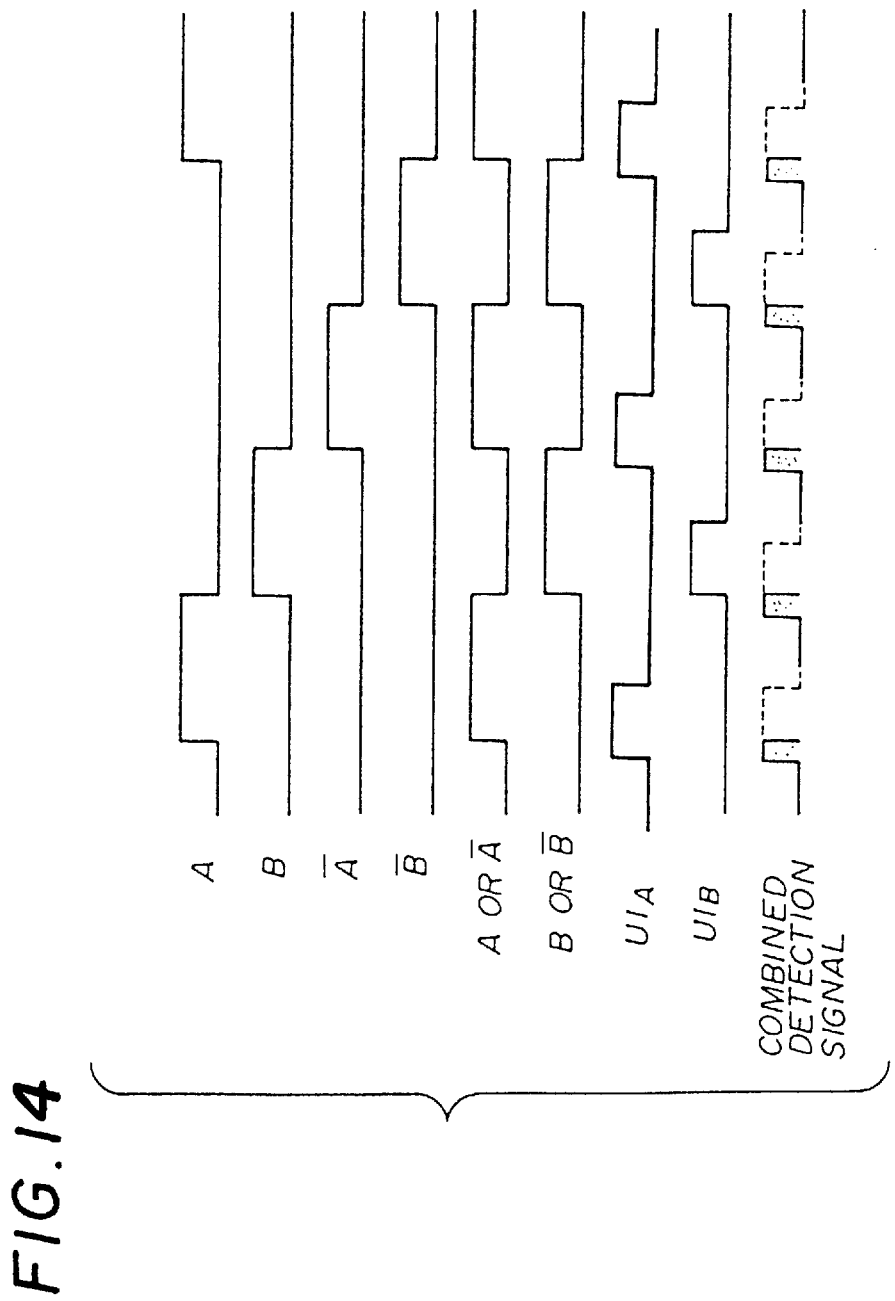
FIG. 14 is a waveform diagram illustrating an alternative of the one-phase excitation operation of the first embodiment of the present invention.
Figure 15:
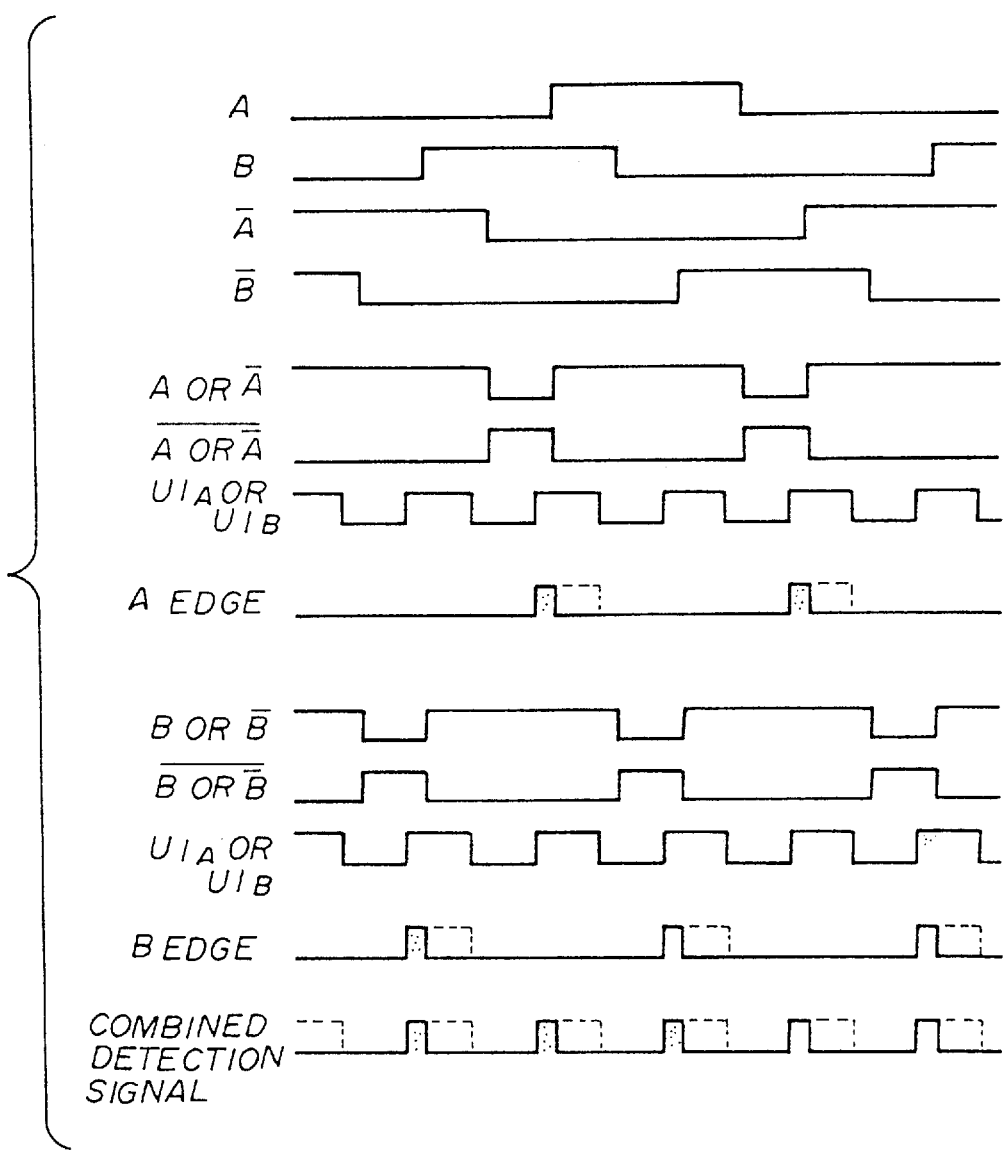
FIG. 15 is a waveform diagram illustrating an alternative of the one-/two-phase excitation operation of the first embodiment of the present invention.
Figure 16:
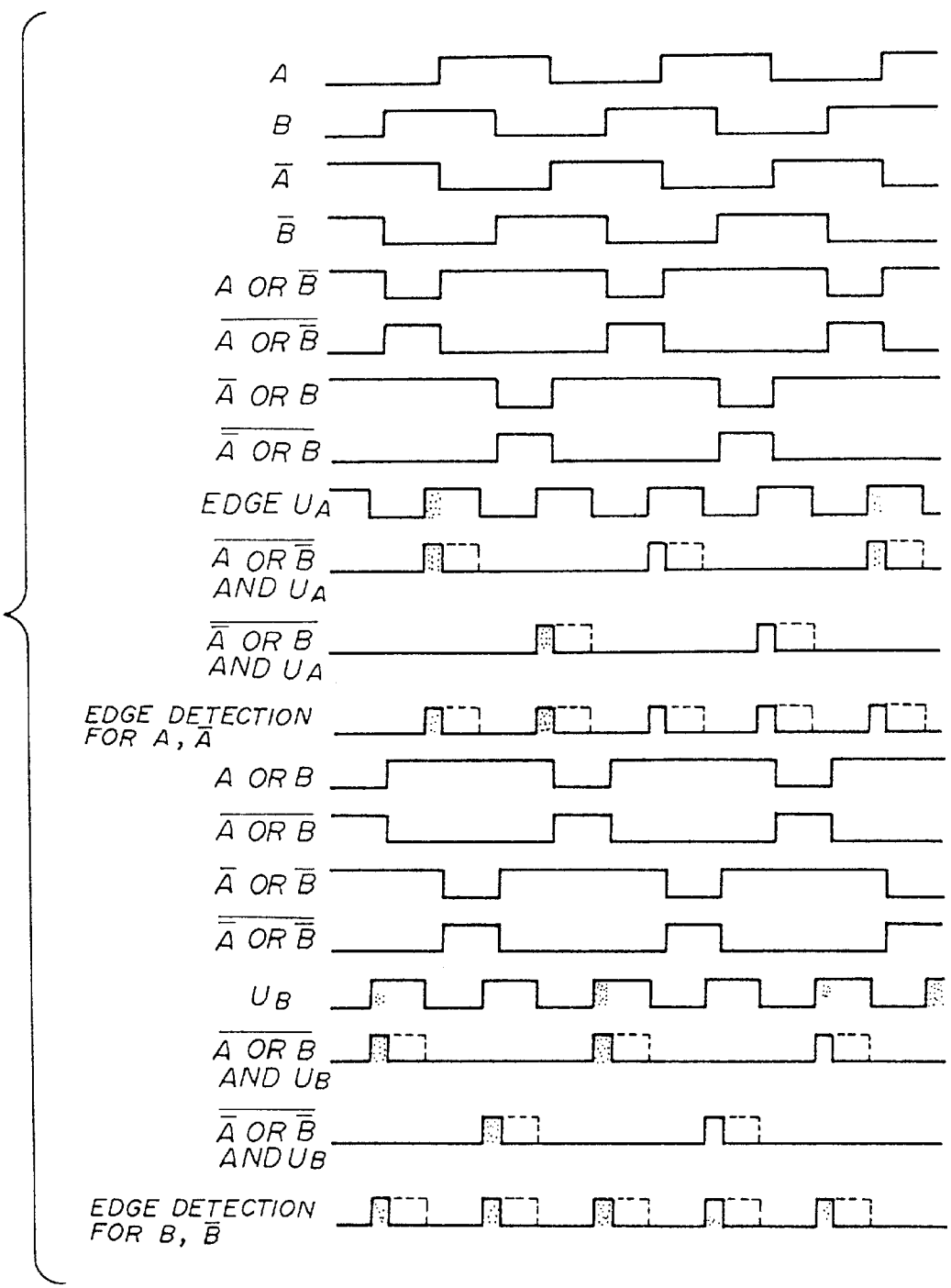
FIG. 16 is a waveform diagram illustrating an alternative of the two-phase excitation operation of the first embodiment of the present invention.

FIGS. 14, 15 and 16 are timing charts of a variation of the phase-edge detection shown in FIGS. 11, 12 and 13. In the variation shown in FIGS. 14–16, each edge detection pulse output by the phase-edge detector 12 rises before the corresponding motor exciting signal rises. Hence, such each edge detection pulse is called an advanced edge detection pulse. In the one-phase excitation shown in FIG. 14, a combined edge detection signal output by the phase-edge detector 12 has pulses, each of which rises in advance of the corresponding leading edge of one of the phases A, ⁻A, B and ⁻B.

In the one-/two-phase excitation shown in FIG. 15, an edge detection signal related to the phases A and ⁻A has pulses, each of which rises in advance of the corresponding leading edge of either the phase A or ⁻A, and is synchronized with the leading edge of a signal ($U1_A$ OR $U1_B$). Similarly, an edge detection signal related to the phases B and ⁻B has pulses, each of which rises in advance of the corresponding leading edge of either the phase B or ⁻B, and is synchronized with the leading edge of the signal ($U1_A$ OR $U1_B$. The combined detection signal output by the phase-edge detector 14 includes the pulses of both the edge detection signal related to the phases A and ⁻A and the edge detection signal related to the phases B and ⁻B.

In the two-phase excitation shown in FIG. 16, an edge detection signal related to the phases A and ⁻A has pulses, each of which rises in advance of the corresponding leading edge of either the phase A or ⁻, and is synchronized with the leading edge of the signal $U_A$. Similarly, an edge detection signal related to the phases B and ⁻B has pulses, each of which rises in advance of the corresponding leading edge of either the phase B or ⁻B, and is synchronized with the leading edge of the signal $U_B$. The combined edge detection signal output by the phase-edge detector 12 includes the pulses of both the edge detection signal related to the phases A and ⁻A and the edge detection signal related to the phases B and ⁻B.

It will be noted that logic circuit configurations operating in the manners shown in FIGS. 11–16 will be designed by the normal knowledge of a person in the art without difficulty.

As has been described previously, a large amount of energy is consumed when a step-up voltage is applied to the motor during the entire one-step period. With the above in mind, according to the embodiment of the present invention, the gate 9 shown in FIG. 5 is opened during a part of the one-step period necessary to immediately raise the motor driving current to a predetermined (threshold) level. The necessary period during which the gate 9 is maintained in the open state can be adjusted by adjusting the reference voltage Vref by the Vref control circuit shown in FIG. 5. Generally, as the revolution speed of the motor is increased, the reference voltage Vref shown in FIG. 7 is increased. The reference voltage Vref is used to be compared with the threshold voltage dependent on the motor driving current and generated by the current detector 5 shown in FIG. 5. As the reference voltage Vref is increased, the threshold voltage for detecting the motor driving current is increased.

For example, referring to FIG. 12 showing the operation timing in the one-/two-phase excitation, the step-up power source switch 7 shown in FIG. 5 is turned ON when the signal (A OR ⁻A) corresponding to the signal (9) shown in FIG. 5 is switched to the low level. When the signal ($U1_A$ OR $U1_B$) corresponding to the gate control signal (10) shown in FIG. 5 is switched to the high level, the gate 9 shown in FIG. 5 is turned ON. When the switch 7 is turned ON, the output capacitor of the step-up power source 8 shown in FIG. 5 is charged up. Thereafter, the gate 9 is opened, and thereby the motor driving current rises rapidly. When the signal ($U1_A$ OR $U1_B$) corresponding to the gate control signal (10) shown in FIG. 5 is switched to the low level, the gate 9 is closed. At this time, the motor driving current has been fully raised to the predetermined level.

Figure 17:
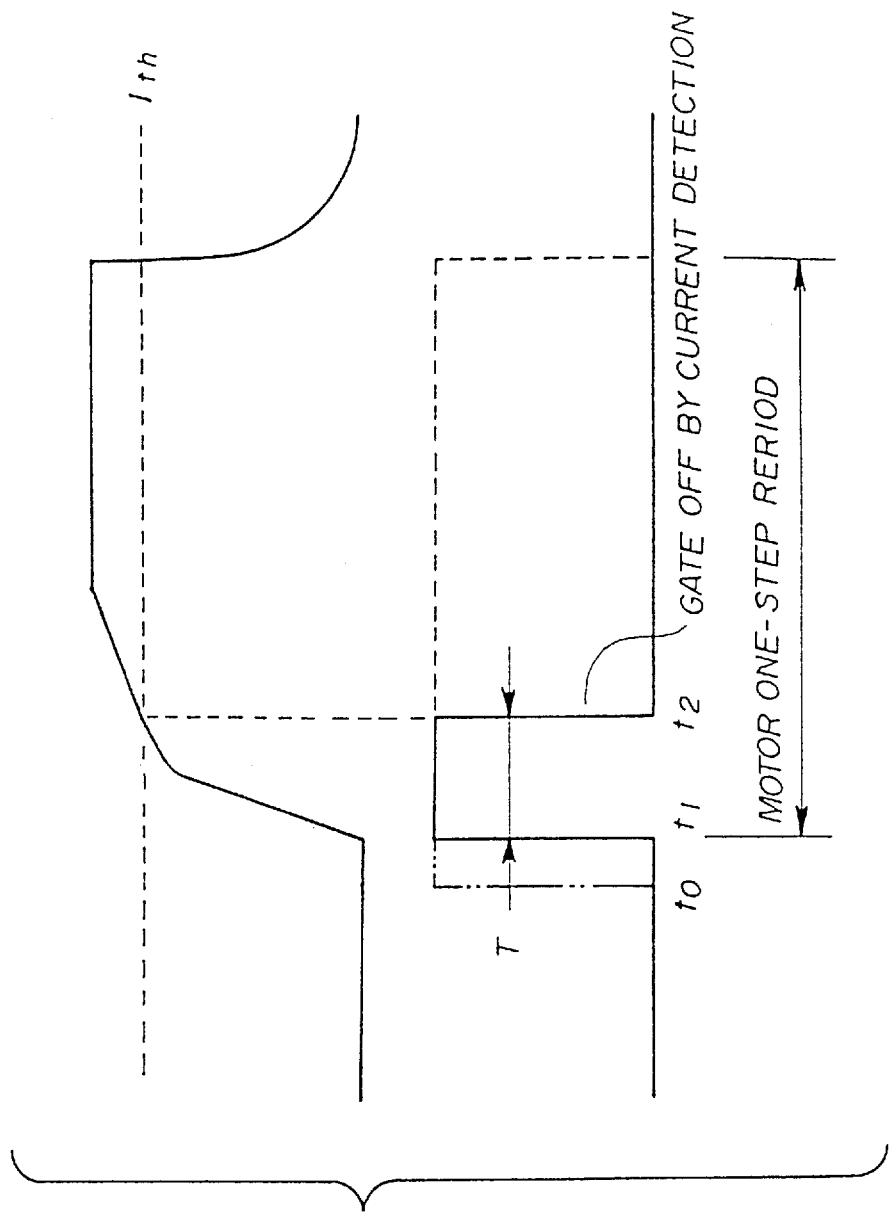
FIG. 17 is a waveform diagram of a motor driving current and a signal indicating the state of a step-up power supply gate used in the first embodiment of the present invention.

FIG. 17 shows the waveform of the motor driving current, and a signal indicating the state of the gate 9 shown in FIG. 5. When the gate control signal is switched to the high level at time $t_1$, the motor driving current starts to rise. At this time, the step-up voltage is applied to the motor driving unit 4. At time $t_2$, the motor driving current reaches a threshold current Ith corresponding to the reference voltage Vth, and thus the gate 9 shown in FIG. 5 is closed. In this manner, the step-up voltage is continuously applied to the motor M during a period T. After time $t_2$, the standard voltage is applied to the motor driving unit 4 instead of the step-up voltage. The above operation corresponds to the timing charts shown in FIGS. 11–13. If it takes a very long time for the motor driving current to reach the predetermined threshold level Ith, it will be necessary to continue to supply the motor M with the step-up voltage during the whole period of one step.

A two-dot chained line shown in FIG. 17 corresponds to the timing charts shown in FIGS. 14–16. At time $t_0$, the gate control signal (10) is switched to the high level in advance of the actual edge of the corresponding phase-edge signal (2) shown in FIG. 5. When the motor driving current reaches the threshold level Ith, the gate 9 shown in FIG. 5 is closed by the current rise detector 14 shown in FIG. 5. Thereby, it becomes possible to keep the gate 9 active during a very short period and suppress power consumption.

Figure 18:
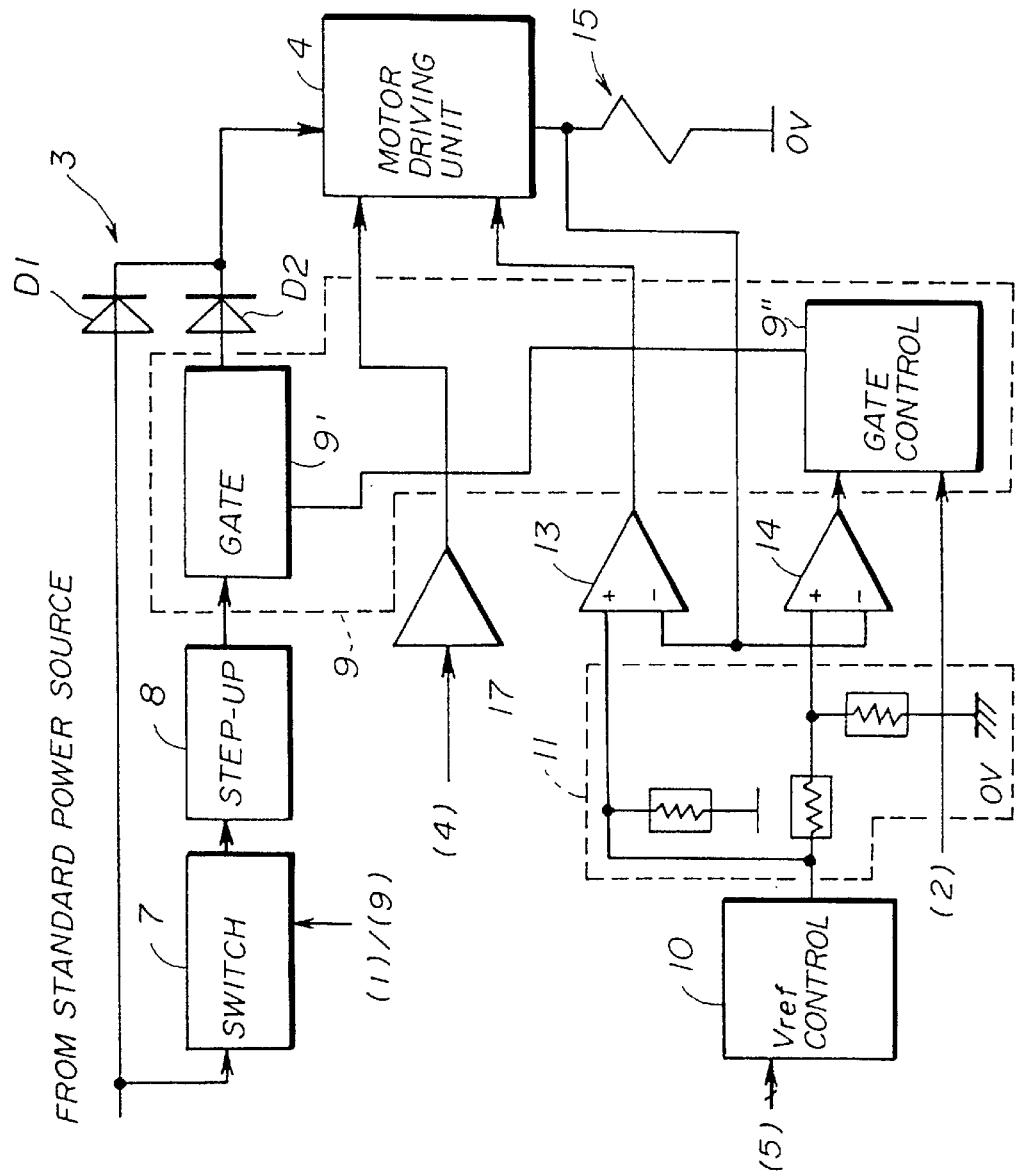
FIG. 18 is a block diagram of a variation of the first embodiment of the present invention.

FIG. 18 is a block diagram of a variation of the configuration shown in FIG. 5. In FIG. 18, parts that are the same as parts shown in the previously described figures are given the same reference numbers. FIG. 18 illustrates the structure shown in FIG. 5 in detail. The current detector 15 is simplified so that it has a single resistor commonly connected to the phases (coils) of the motor M. Further, the current rise detector 14 is also simplified so that it has a single comparator. The voltage corresponding to the current flowing in the motor M is applied to the inverting input terminal of the comparator of the current rise detector 14. The constant-current chopper circuit 13 is formed with a comparator having an inverting terminal to which the voltage corresponding to the current flowing in the motor is applied. The level converter 11 includes three resistors, which derive threshold voltages (Vth2 and Vth1 shown in FIG. 21) respectively applied to the chopper circuit 13 and the detector 14 from the output signal of the Vref control circuit 10.

The step-up power supply gate 9 includes a gate circuit 9' and a gate control circuit 9". The gate control circuit 9" includes the function of the phase-edge detector 12 shown in FIG. 5. Thus, the gate control circuit 9" receives the output signal of the current rise detector 14 and the phase-edge signals (2) from the microcomputer 50 shown in FIG. 5. In this case, the edge signal corresponds to, for example, the signal (A1$_A$ OR U1$_B$) shown in FIG. 11 or FIG. 13, or the combined edge detection signal shown in FIG. 14, FIG. 15 or FIG. 16. The gate control circuit 9" turns ON the gate control signal in synchronism with or in advance of the phase edge in each of the phases, and turns OFF the gate control signal in response to the detection signal from the constant-current detector 14. The phase exciting driver 17 includes a buffer amplifier, which receives the phase (motor) exciting signals A, ⁻A, B and ⁻B, and outputs buffered phase exciting signals to the motor driving unit 4.

The motor driving unit 4 includes switching transistors respectively connected to the coils of the motor M (not shown in FIG. 18 for the sake of simplicity). These transistors are respectively controlled by the buffered phase exciting signals provided for the respective phases. In the configuration shown in FIG. 18, either the step-up voltage or the standard voltage is commonly applied to all the coils of the motor M via the motor driving unit 4. This holds true for the configuration shown in FIG. 5.

The voltage selecting circuit 3 includes two diodes D1 and D2. The configuration shown in FIG. 18 is also connected to the microcomputer 50 (shown in FIG. 5).

Figure 19:
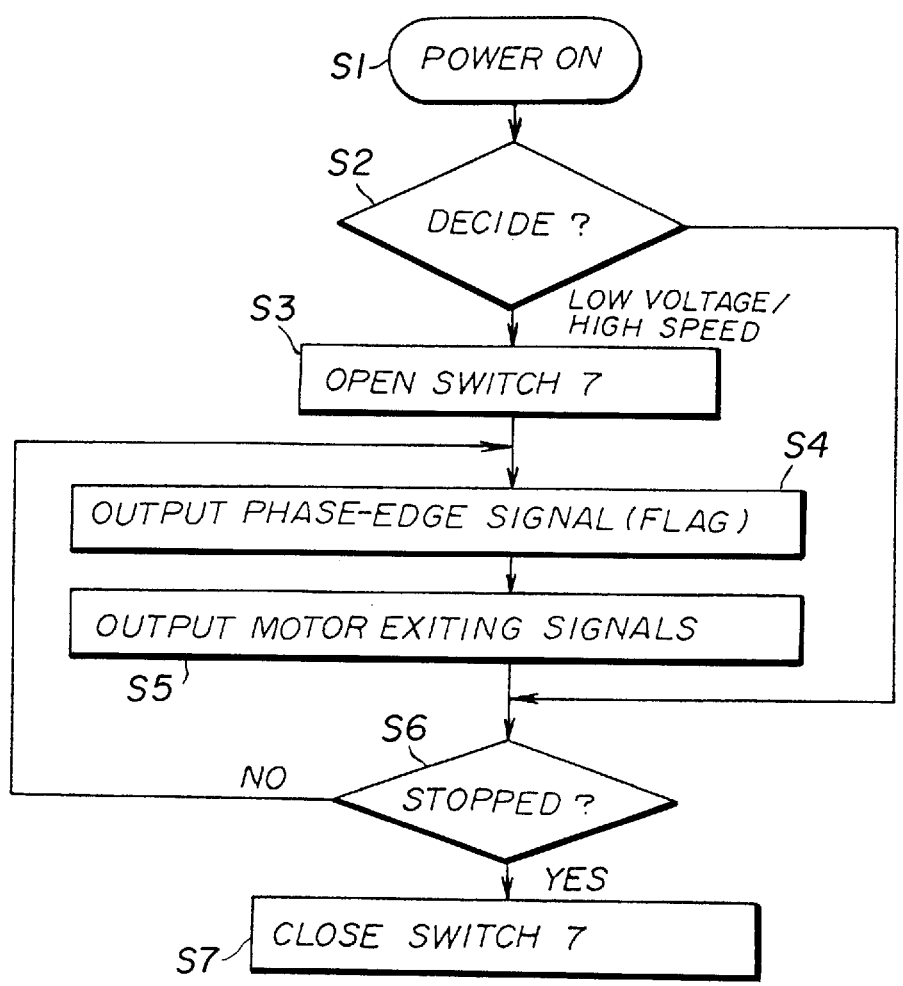
FIGS. 19 and 20 are flowcharts of the operation of the variation shown in FIG. 18.
Figure 20:
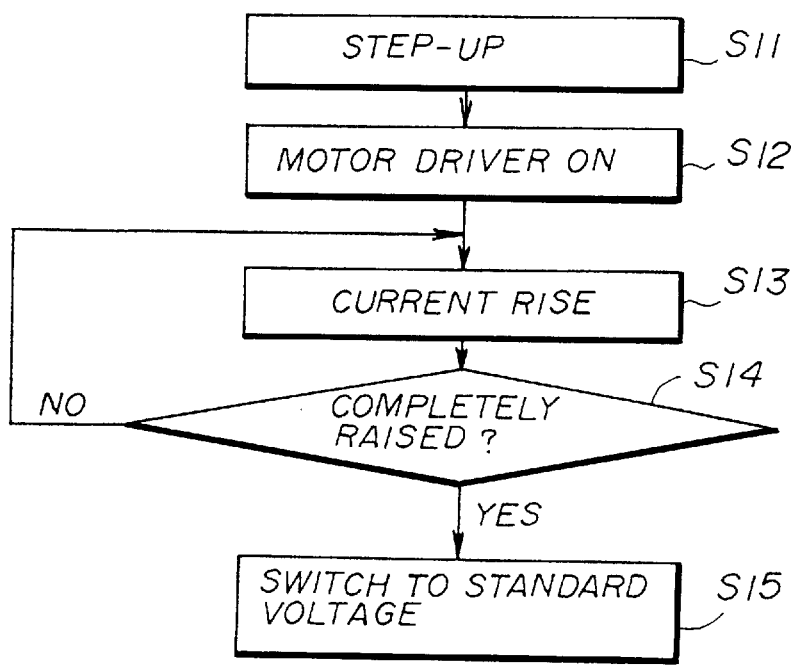

FIGS. 19 and 20 are flowcharts of the operation of the configuration shown in FIG. 18. In step S1, the configuration shown in FIG. 18 is powered. In step S2, the microcomputer 50 (FIG. 5) determines whether or not the step-up power source 2 should be activated on the basis of parameters regarding the operation of the motor M, these parameters being previously input to the microcomputer 50. For example, when it is required that the motor M should be operated at a high speed, the microcomputer 50 turns ON the switch 7 shown in FIG. 18 in step S3 by applying the switch signal (1) to the switch 7. The microcomputer 50 outputs the phase-edge signal (flag) to the gate control circuit 9" in step S4, and supplies the phase exciting driver 17 with the motor exciting signals indicating which coil (or both the coils) should be turned ON in step S5.

In response to steps S3 and S4, the step-up voltage is applied to the motor driving unit 4 in step S11. In response to step S5, the corresponding transistor switch or switches provided in the motor driving unit 4 is or are turned ON in step S12. In step S13, the motor driving current flowing in the corresponding coil or coils rises rapidly. When it is detected that the motor driving current reaches the threshold level Ith (FIG. 17), the gate circuit 9' shown in FIG. 18 is closed in step S15.

In step S6, as long as the control signal (9) applied to the switch 7 is active, the steps S4 and S5 are carried out. When the control signal (9) is turned OFF (switched to the low level) in synchronism with one of the motor exciting signals A, ⁻, B and ⁻B, the switch 7 is closed in step S7.

Figure 21:
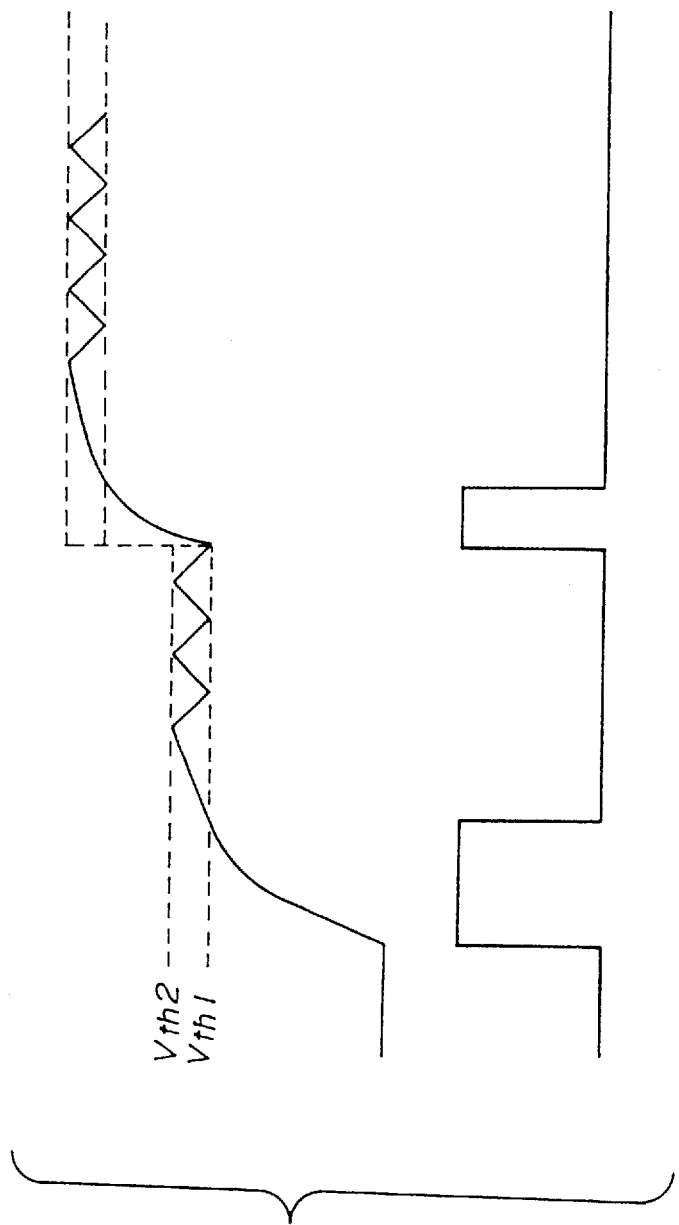
FIG. 21 is a waveform diagram showing a change in the level of the motor driving current and a chopping operation.

FIG. 21 is a waveform diagram of the voltage applied to the motor and the gate control signal applied to the gate circuit 9' shown in FIG. 18. The threshold voltage Vth2 applied to the comparator of the chopping circuit 13 is greater than the threshold voltage Vth1 applied to the comparator of the current rise detector 14. When the voltage output by the current detector 15 exceeds the threshold voltage Vth1, the gate circuit 9' is turned OFF, and the standard voltage generated by the battery of the standard power source 1 shown in FIG. 5 becomes applied to the motor M. Then, the motor driving current gradually increases, and the corresponding voltage generated by the current detector 15 becomes equal to the threshold voltage Vth2 applied to the comparator of the chopping circuit 13. The output signal of the chopping circuit 13 obtained at this time turns OFF the corresponding switching transistor provided in the motor driving unit 4. In this manner, the voltage applied to the motor M is regulated.

When a larger quantity of the motor driving current is needed in order to rotate the motor M at a higher speed, the threshold voltages Vth1 and Vth2 are increased by increasing the reference voltage Vref applied to the Vref control circuit 10.

As shown in FIG. 22, the switch 7 is periodically turned ON and OFF in response to the control signal (9) output by the power source control decision unit 16 shown in FIG. 5. Hence, the step-up power source 8 is periodically activated, and generates the step-up voltage. In an alternative modification, it is possible to keep the switch 7 open. In this case, the constant step-up voltage is continuously output by the step-up power source 8. In the case shown in FIG. 22, the gate circuit 9' may be opened before the step-up voltage has not been raised to the predetermined level. The above modification can avoid such a problem. In the modification, the timing controls as shown in FIGS. 14, 15 and 16 are employed.

For example, in FIG. 15 (one-/two-phase excitation), the logic (A OR ⁻A) and the inverted version thereof are operated. Then, the AND operation on the inverted version and the ($U1_A$ OR $U1_B$) is calculated. In this manner, the phase-edge signal indicating the edges of the motor exciting signals A and ⁻A can be obtained. In FIG. 16 (two-phase excitation), the leading edge of the motor exciting signal A is detected by a logic operation (⁻(A OR ⁻B AND $U_A$)) where (⁻) is the inverted logic operation of the logic ( ). The leading edge of the motor exciting signal B is detected by a logic operation (⁻(A OR ⁻B AND $U_B$)). The leading edge of the motor exciting signal ⁻A is detected by a logic operation (⁻(⁻A OR B AND $U_A$)). The leading edge of the motor exciting signal ⁻B is detected by a logic operation (⁻(⁻A OR ⁻B AND $U_B$)). Since only one gate circuit 9' is used in the configuration shown in FIG. 18, the gate control signal applied to the gate circuit 9' is the result of an OR logic operation on the abqve four logic operations, that is, (⁻(A OR ⁻B AND $U_A$)) OR (⁻(A OR B AND $U_A$)) OR (⁻(⁻A OR B AND $U_B$)) OR (⁻(⁻A OR ⁻B AND $U_B$)).

In the configurations shown in FIGS. 5 and 18, the step-up power source 8 and the gate 9 are commonly provided for all the phases (coils) of the motor M, as shown in FIG. 23A. As shown in FIG. 23A, the step-up power source 8 has a switching circuit 8a and a capacitor 8b.

FIG. 23B is a block diagram of the principle of a second embodiment of the present invention. In the second embodiment of the present invention, the step-up power source 8 is commonly provided for all the phases (coils) of the motor M, while two step-up power supply gates 9a and 9b are provided for a pair of phases A and ⁻A and a pair of phases B and ⁻B. The gate 9a is controlled by, for example, the output signal of the open-collector circuit OC1 shown in FIG. 6, and the gate 9b is controlled by, for example, the output signal of the open-collector circuit OC2 shown in FIG. 6. In this case, the output terminals of the open-collector circuits OC1 and OC2 are not connected together, but connected to the gates 9a and 9b, respectively. In other words, the signals $U1_A$ and $U1_B$ shown in FIGS. 11–13 can be applied to the gates 9a and 9b, respectively. Similarly, the corresponding signals shown in FIGS. 14–16 can be applied to the gates 9a and 9b.

FIG. 23B is a block diagram of the principle of a third embodiment of the present invention. In the third embodiment of the present invention, the step-up power source 8 includes circuit parts respectively provided for the pair of phases A and ⁻A and the pair of phases B and ⁻B. The gates 9a and 9b are respectively provided for the pair of phases A and ⁻A and the pair of phases B and ⁻B. More particularly, the step-up power source 8 includes the switching circuit 8a, a selective current distributing circuit 8c, and two capacitors 8d and 8e. The selective current distributing circuit 8c selectively supplies a current to either the capacitor 8d or the capacitor 8e. The voltage across the capacitor supplied with the current is less than the voltage across the other capacitor. The capacitor 8d is connected to the gate 9d, and the capacitor 8e is connected to the gate 9e.

The respective natures of the configurations shown in FIGS. 23A, 23B and 23C will now be described with reference to FIG. 24. In the configuration shown in FIG. 23A, the power supply voltage is commonly applied to the two coils of the motor M shown in FIG. 5. When both the motor exciting signals A and B shown in parts (a) and (b) of FIG. 5 are active, the motor driving currents flow in the corresponding two coils. When it is necessary for each of the motor driving currents to have a magnitude I, the step-up power source 8 has a capability making it possible to provide 2×I (twice the magnitude I), as shown in part (c) of FIG. 24.

In the configuration shown in FIG. 23B, the gate 9a is provided for the phases A and ⁻, and the gate 9b is provided for the phases B and ⁻B. Hence, the power supply voltage (either the step-up voltage or the standard voltage) is applied to either the phase A (⁻A) or the phase B (⁻B). Hence, it is enough to design the step-up power source 8 so that it has a capability making it possible to provide the magnitude I, as shown in part (d) of FIG. 24.

In the configuration shown in FIG. 23C, the step-up power sources (capacitors 8d and 8e) and the gates 9a and 9b are respectively provided for the pair of phases A and ⁻A and the pair of phases B and ⁻B. Hence, it is enough to design the step-up power source 8 so that it has a capability making it possible to provide the magnitude I, as shown in part (e) of FIG. 24. Further, it is possible to separately charge up the capacitors 8d and 8e with a period twice the period shown in parts (c) and (d). Since the charging period is increased, it is possible to use capacitors having a capacitance greater than that of the capacitor 8b and to more rapidly raise the motor driving currents to the predetermined level.

Figure 25:
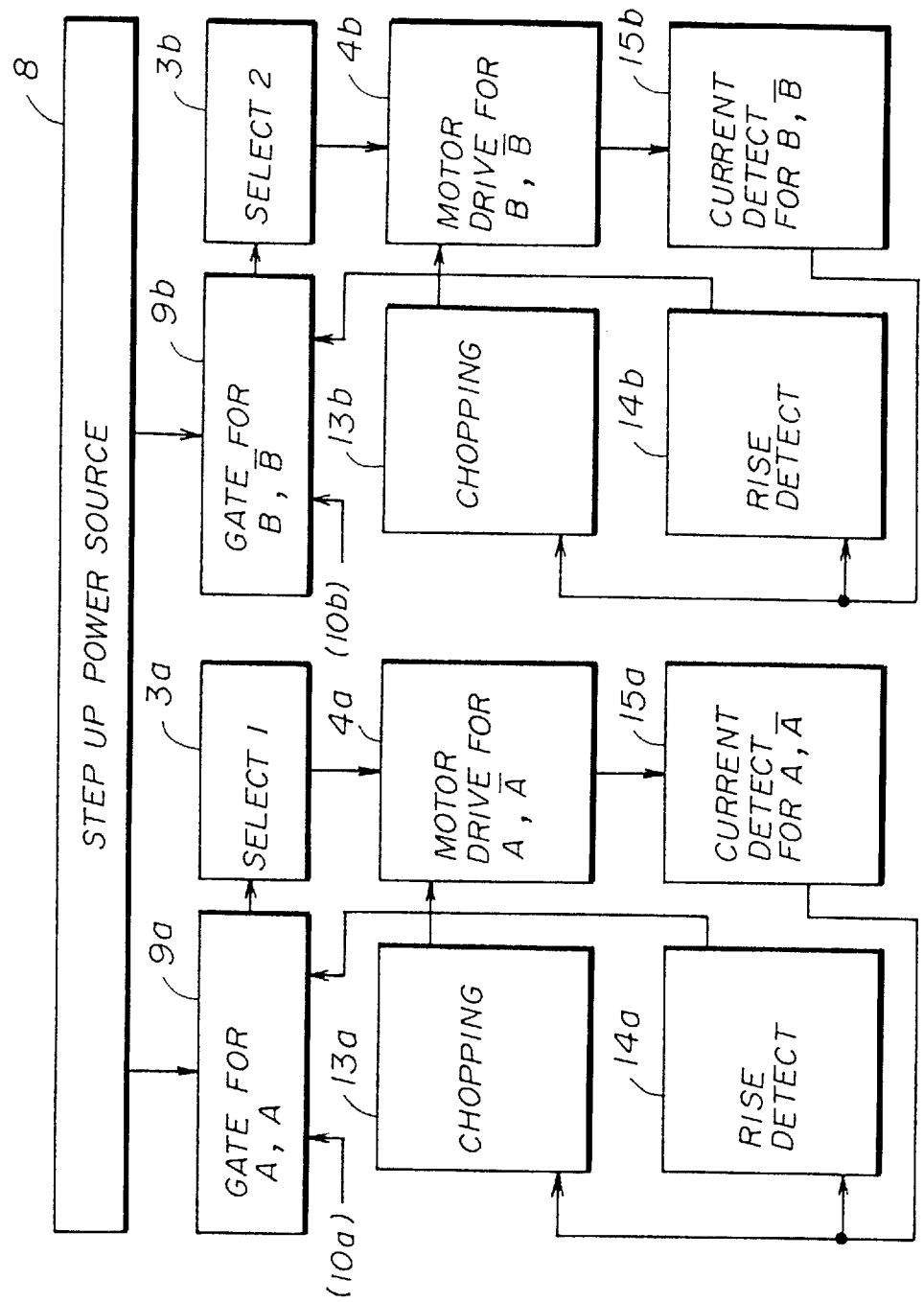
FIG. 25 is a block diagram of the third embodiment of the present invention.

FIG. 25 is a block diagram of the details of the configuration shown in FIG. 23C. In FIG. 25, parts that are the same as those shown in the previously described figures are given the same reference numbers. With respect to the phases A and ⁻A, the configuration shown in FIG. 25 includes the gate 9a, a voltage selecting circuit 3a, a motor driving circuit 4a, a constant-current chopper circuit 13a, a current rise detector 14a and a current detector 15a. With respect to the phases B and ⁻B, the configuration shown in FIG. 25 includes the gate 9b, a voltage selecting circuit 3b, a motor driving circuit 4b, a constant-current chopper circuit 13b, a current rise detector 14b and a current detector 15b. These structural elements are configured in the same manner as the corresponding elements that have been described previously. The configuration shown in FIG. 23B can be configured in the same manner as shown in FIG. 25 except that the gates 9a and 9b are commonly connected to the capacitor 8b shown in FIG. 23B.

The present invention is not limited to the specifically disclosed embodiments, and variations and modifications may be made without departing from the scope of the present invention. For example, it is possible to close the gates 9, 9a and 9b when a predetermined time has elapsed after these gates are closed.

What is claimed is:

1. A motor driving circuit coupled to a motor having phases, said motor driving circuit comprising:

a first power source generating a first power supply voltage;

a second power source genera ting a second power supply voltage greater than the first power supply voltage;

selecting means, coupled to the first power source and the second power source, for selecting either the first power supply voltage or the second power supply voltage in response to a selecting signal;

motor driving means for causing currents to flow in the phases of the motor by using the first and second power supply voltage selected by the selecting means is applied to one or more phases;

detecting means for detecting a rising of current flowing through at least one of the phases of the motor, and for producing an output signal; and switching means, coupled to the selecting means, for generating the selecting signal in accordance with the output signal produced by the detecting means so that, in response to each rising of the current detected by the detecting means during an initial period of motor driving, the second power supply voltage is selected and applies and the first power supply voltage is then selected and applied, wherein only one of the phases is supplied with the second power supply voltage at one time.

2. The motor driving circuit as claimed in claim 1, further comprising:

means for generating a voltage signal indicative of the current flowing through at least one of the phases of the motor, wherein said switching means comprises means for selecting the second power voltage until said voltage signal reaches a threshold level and for selecting the first power supply voltage after said voltage signal reaches the threshold level.

3. The motor driving circuit as claimed in claim 1, wherein:

the second power source has an output capacitor commonly coupled to the phases of the motor via the selecting means; and the second power supply voltage is commonly applied to the phases to the motor via the selecting means.

4. The motor driving circuit as claimed in claim 1, wherein:

the phases include a first pair of phases and a second pair of phases;

the second power source has an output capacitor commonly coupled to the first and second pairs of phases of the motor via the selecting means;

the selecting means comprises a first gate provided between the output capacitor and the first pair of phases, and a second gate provided between the output capacitor and the second pair of phases; and the switching means comprises means for generating a first selecting signal applied to the first gate and dependent on the motor driving signals and a first current flowing in the first pair of phases and for generating a second selecting signal applied to the second gate and dependent on the motor driving signals and a second current flowing in the second pair of phases.

5. The motor driving circuit as claimed in claim 1, wherein:

the phases include a first pair of phases and a second pair of phases;

the second power source has a first output capacitor coupled to the first pair of phases of the motor via the selecting means, and a second output capacitor coupled to the second pair of phases via the selecting means;

the selecting means comprises a first gate provided between the first output capacitor and the first pair of phases, and a second gate provided between the second output capacitor and the second pair of phases; and the switching means comprises means for generating a first selecting signal applied to the first gate and dependent on the motor driving signals and a first current flowing in the first pair of phases and for generating a second selecting signal applied to the second gate and dependent on the motor driving signals and a second current flowing in the second pair of phases.

6. The motor driving circuit as claimed in claim 1, further comprising:

means for generating a voltage signal indicative of the current flowing through at least one of the phases of the motor, wherein the switching means generates the selecting signal to be switchable to a first level and a second level, the first level causing the selecting means to select the second power supply voltage in synchronism with a change in a level of the motor driving signals, and the second level causing the selecting means to select the first power supply voltage when the voltage signal reaches a threshold level.

7. The motor driving circuit as claimed in claim 5, wherein said switching means comprises:

first means for setting the first selecting signal to a first level causing the first gate to connect the first output capacitor to the first pair of phases in synchronism with a change in a level of one of the motor driving signals related to the first pair of phases, and for setting the first selecting signal to a second level causing the first gate to disconnect the first output capacitor from the first pair of phases when the first current reaches a first threshold level; and second means for setting the second selecting signal to a third level causing the second gate to connect the second output capacitor to the second pair of phases in synchronism with a change in a level of one of the motor driving signals related to the second pair of phases, and for setting the second selecting signal to a fourth level casing the second gate to disconnect the second output capacitor from the second pair of phases when the second current reaches a second threshold level.

8. The motor driving circuit as claimed in claim 1, further comprising:

means for generating a voltage signal indicative of the current flowing through at least one of the phases of the motor, wherein the switching means generates the selecting signal to be switchable to a first level and a second level, the first level causing the selecting means to select the second power supply voltage in advance of a change in a level of one of the motor driving signals, and the second level causing the selecting means to select the first power supply voltage when the voltage signal reaches a threshold level.

9. The motor driving circuit as claimed in claim 5, wherein said switching means comprises:

first means for setting the first selecting signal to a first level causing the first gate to connect the first output capacitor to the first pair of phases in advance of a change in a level of one of the motor driving signals related to the first pair of phases, and for setting the first selecting signal to a second level causing the first gate to disconnect the first output capacitor from the first pair of phases when the first current reaches a first threshold level; and second means for setting the second selecting signal to a third level causing the second gate to connect the second output capacitor to the second pair of phases in advance of a change in a level of one of the motor driving signals related to the second pair of phases, and for set ting the second selecting signal to a fourth level causing the second gate to disconnect the second output capacitor from the second pair of phases when the second current reaches a second threshold level.

10. A motor driving circuit for driving a motor having phases, said motor driving circuit comprising:

means for detecting leading edges of motor driving signals respectively applied to the phases of the motor;

means for applying a step-up voltage to the phases on the basis of the leading edges detected by the means for detecting a leading edge, wherein only one phase is supplied with a step-up voltage at a time;

means for detecting a magnitude of a current flowing in at least one of the phases; and means for applying a voltage less than the step-up voltage to the phases on the basis of the magnitude of the current detected by the means for detecting a magnitude.

11. The motor driving circuit as claimed in claim 10, wherein the fourth means comprises means for comparing a voltage signal corresponding to the current with a threshold level, and for applying the voltage to the phases when the voltage signal exceeds the threshold level.

12. A motor driving method for driving a motor having phases, comprising:

detecting leading edges of motor driving signals respectively applied to the phases of the motor;

applying a step-up voltage to the phases one at a time on the basis of the leading edges detected in the step of detecting leading edges;

detecting a magnitude of a current flowing in at least one of the phases; and applying a voltage less than the step-up voltage to the phases on the basis of the magnitude of the current detected in the step of detecting a magnitude.

13. The motor driving method as claimed in claim 12, wherein the step of applying a voltage comprises:

comparing a voltage signal corresponding to the current with a threshold level; and applying the voltage to the phases when the voltage signal exceeds the threshold level.

14. A motor driving circuit coupled to a motor having phases, the motor driving circuit comprising:

a first power source generating a first power supply voltage;

a second power source generating a second power supply voltage greater than the first power supply voltage;

selecting means, coupled to the first power source and the second power source, for selecting one of the first power supply voltage and the second power supply voltage in response to a selecting signal, the selected one of the first power supply voltage and the second power supply voltage being applied to the motor and causing a current to flow in the phase of the motor;

detecting means for detecting a rising of the current flowing through at least one of the phases of the motor, and for producing an output signal; and switching means, coupled to the selecting means, for generating the selecting signal in accordance with the output signal produced by the detecting means so that the first power supply voltage is initially selected and applied to the motor and, in response to each rising of the current detected by the detecting means during an initial period of motor driving, the second power supply voltage is selected and applied and then the first power supply voltage is selected and applied, wherein only one of the phases is supplied with the second power supply voltage at one time.

* * * * *

UNITED STATES PATENT AND TRADEMARK OFFICE
CERTIFICATE OF CORRECTION

PATENT NO.: 5,811,953
DATED : September 22, 1998
INVENTOR(S): Sumio WATANABE et al.

It is certified that error appears in the above-identified patent and that said Letters Patent is hereby corrected as shown below:

Col. 2, line 53, change "bjects" to --objects--;
line 54, change "1" to --will--.

Col. 8, line 38, delete "'" (second occurrence).

Col. 12, line 38, after "-" (first occurrence) insert --A--.

Col. 14, line 58, change "genera ting" to --generating--.

Col. 15, line 10, change "applies" to --applied--.

Col. 16, line 30, change "casing" to --causing--;
line 62, change "set ting" to --setting--.

Signed and Sealed this

Sixth Day of April, 1999

Attest:

Q. TODD DICKINSON

*Attesting Officer*  *Acting Commissioner of Patents and Trademarks*